United States Patent
Vrzic

(10) Patent No.: US 10,129,108 B2
(45) Date of Patent: Nov. 13, 2018

(54) SYSTEM AND METHODS FOR NETWORK MANAGEMENT AND ORCHESTRATION FOR NETWORK SLICING

(71) Applicant: Sophie Vrzic, Kanata (CA)

(72) Inventor: Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/242,014

(22) Filed: Aug. 19, 2016

(65) Prior Publication Data

US 2017/0142591 A1 May 18, 2017

Related U.S. Application Data

(60) Provisional application No. 62/255,102, filed on Nov. 13, 2015, provisional application No. 62/269,691, (Continued)

(51) Int. Cl.

| | | |
|---|---|---|
| *H04L 12/24* | (2006.01) | |
| *H04W 76/11* | (2018.01) | *H04W 24/02* (2009.01) |
| *H04W 28/02* | (2009.01) | |
| *H04L 12/851* | (2013.01) | |
| *H04W 16/02* | (2009.01) | |
| *H04L 29/08* | (2006.01) | |
| *H04W 48/06* | (2009.01) | |
| *H04W 24/08* | (2009.01) | |
| *H04L 12/927* | (2013.01) | |

(52) U.S. Cl.
CPC ...... *H04L 41/5054* (2013.01); *H04L 41/5051* (2013.01); *H04L 47/2408* (2013.01); *H04L 67/16* (2013.01); *H04L 67/303* (2013.01); *H04W 16/02* (2013.01); *H04W 24/02* (2013.01); *H04W 24/08* (2013.01); (Continued)

(58) Field of Classification Search
CPC ............ H04L 41/5054; H04L 41/5051; H04L 67/303; H04L 47/2408; H04L 67/16; H04L 47/805; H04W 24/02; H04W 28/0289; H04W 16/02; H04W 76/021; H04W 48/06; H04W 24/08
See application file for complete search history.

(56) References Cited

U.S. PATENT DOCUMENTS

| | | | |
|---|---|---|---|
| 2011/0276447 A1 | 11/2011 | Paul et al. | |
| 2013/0007232 A1 | 1/2013 | Wang et al. | |
| 2014/0293882 A1* | 10/2014 | Choi | H04W 76/04 370/329 |
| 2015/0029853 A1* | 1/2015 | Raindel | H04L 47/127 370/235 |

(Continued)

FOREIGN PATENT DOCUMENTS

| | | |
|---|---|---|
| CN | 103782556 A | 5/2014 |
| CN | 104253767 A | 12/2014 |

(Continued)

OTHER PUBLICATIONS

NTT DOCOMO S1-152156: Network Slicing—Service/ Traffic Dependent Selection 3GPP TSG-SA WG1 Meeting #71.21.08.2015.

(Continued)

*Primary Examiner* — Brandon J Miller

(57) ABSTRACT

Systems and methods for implementing virtualized functions in control and data planes for a communications network are described herein. A method for managing a User Equipment (UE) attach request includes instantiating a Global Connection and Mobility Management (G-CMM) function configured to operate across a plurality of network slices in the communications network, determining an (Continued)

appropriate network slice from the plurality of network slices with the G-CMM function, and attaching the UE to the appropriate network slice.

26 Claims, 20 Drawing Sheets

Related U.S. Application Data filed on Dec. 18, 2015, provisional application No. 62/320,262, filed on Apr. 8, 2016, provisional application No. 62/337,122, filed on May 16, 2016, provisional application No. 62/358,498, filed on Jul. 5, 2016.

(52) U.S. Cl.
CPC ....... *H04W 28/0289* (2013.01); *H04W 48/06* (2013.01); *H04W 76/11* (2018.02); *H04L 47/805* (2013.01); *H04L 67/141* (2013.01)

(56) References Cited

U.S. PATENT DOCUMENTS

| | | | |
|---|---|---|---|
| 2015/0365288 A1* | 12/2015 | Van Der Merwe | H04L 41/5051 370/254 |
| 2017/0164212 A1* | 6/2017 | Opsenica | H04W 24/02 |

FOREIGN PATENT DOCUMENTS

| | | | |
|---|---|---|---|
| CN | 106375987 A | 2/2017 | |
| WO | 2011032595 A1 | 3/2011 | |
| WO | 2015021248 A1 | 2/2015 | |
| WO | WO2017023196 A1 * | 8/2015 | ............ H04W 24/02 |
| WO | WO2017025149 A1 * | 8/2015 | ............ H04L 29/06 |
| WO | 2015149600 A1 | 10/2015 | |
| WO | 2017012402 A1 | 1/2017 | |

OTHER PUBLICATIONS

3GPP TR 22.891 entitled "Study on New Services and Markets Technology Enablers".
ETSI GS NFV 001 entitled "Network Function Virtualization (NFV); Use Cases", Oct. 2013.
ETSI GS NFV 002 entitled "Network Function Virtualization (NFV); Architectural Framework", Oct. 2013.
3GPP TR 23.707, entitled "Architecture Enhancements for Dedicated Core Networks; Stage 2," V. 13.0.0, Dec. 7, 2014.
Telecommunication Standardization Sector IMT-I-096r1, International Telecommunication Union Focus Group on IMT-2020, "Draft deliverable of Network softwarization for IMT-2020 networks", Network Softwarization group, Beijing, Oct. 21-30, 2015, total 64 pages.
S2-161431, "Update of solution for support of multiple connections to multiple Network Slices", SA WG2 Meeting #114, Apr. 11-15, 2016, Sophia Antipolis, France, Source: NTT DOCOMO.

* cited by examiner

SYSTEM AND METHODS FOR NETWORK MANAGEMENT AND ORCHESTRATION FOR NETWORK SLICING

CROSS-REFERENCE TO RELATED APPLICATIONS

This application claims priority to U.S. Provisional Patent Application No. 62/255,102 filed Nov. 13, 2015, U.S. Provisional Patent Application No. 62/269,691 filed Dec. 18, 2015, U.S. Provisional Patent Application No. 62/320,262 filed Apr. 8, 2016, U.S. Provisional Patent Application No. 62/337,122 filed May 16, 2016, and U.S. Provisional Patent Application No. 62/358,498 filed Jul. 5, 2016, the contents of each of which are incorporated herein by reference in their entirety.

FIELD OF THE INVENTION

The present invention pertains to the field of network communications, and in particular to a system and methods for implementing network slicing.

BACKGROUND

Communication networks enabled by technologies such as Network Function Virtualization, Software Defined Networking, and the like, may be flexibly organized so as to serve various customer demands. In building advanced networks, such as those to support future developments in wireless networks (including next generation wireless, such as so-called Fifth Generation (5G) networks), network slicing provides the ability to create isolated virtual networks over which different traffic flows can travel. Network slicing provides flexibility and adaptability which are desired features of 5G systems. However, managing variable and competing demands on a potentially large network scale is a complex proposition requiring an effective architecture and management thereof. The problem of managing the different demands becomes exacerbated when there are demands for a number of different types of services. Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a system and methods for providing multiple types of network slices. Accordingly, embodiments provide network operators with the ability to offer different types of slices for different types of services or sessions.

In accordance with embodiments of the present invention, there is provided a method for managing a customer service request in a communications network. The method includes receiving the customer service request by the G-CSM, determining if the network service request can be accommodated using an existing network slice, and, if it cannot be accommodated, instantiating a new network slice to accommodate the customer service request. The G-CSM may be a function within the OSS/BSS entity or it may be an external function with an interface to the OSS/BSS.

An aspect of the disclosure provides a method for managing a Network Service (NS) request in a communications network having a plurality of network slices. The method includes instantiating a Global Connection and Mobility Management (G-CMM) function in the communications network, the G-CMM function configured to operate across the plurality of network slices. The method further includes selecting an appropriate network slice from the plurality of network slices with the G-CMM function and attaching the NS to the appropriate network slice. In some embodiments the method further includes differentiating the network slices by the type of Mobility Management Entity (MME) or enhanced MME that is instantiated within the network slice. In some embodiments each network slice has only one MME type. However, multiple network slices may have the same MME type.

Another aspect provides a method for the management and orchestration of network slices in a communications network having a plurality of network slices. The method includes receiving, by a Network Slice Orchestrator, a Network Slice Update Request from the Resource Orchestrator for instantiating a NS; creating a new network slice or updating an existing network slice to accommodate the NS request; and attaching the NS to the appropriate network slice.

Another aspect of the disclosure provides an architecture for associating network service requests to network slices. Such an architecture includes a Global Connection and Mobility Management (G-CMM) function in the communications network, the G-CMM function configured to operate across the plurality of network slices and an enhanced NFV-MANO including a plurality of Orchestrator functions.

BRIEF DESCRIPTION OF THE FIGURES

Further features and advantages of the present invention will become apparent from the following detailed description, taken in combination with the appended drawings, in which.

DETAILED DESCRIPTION

Figure 1:
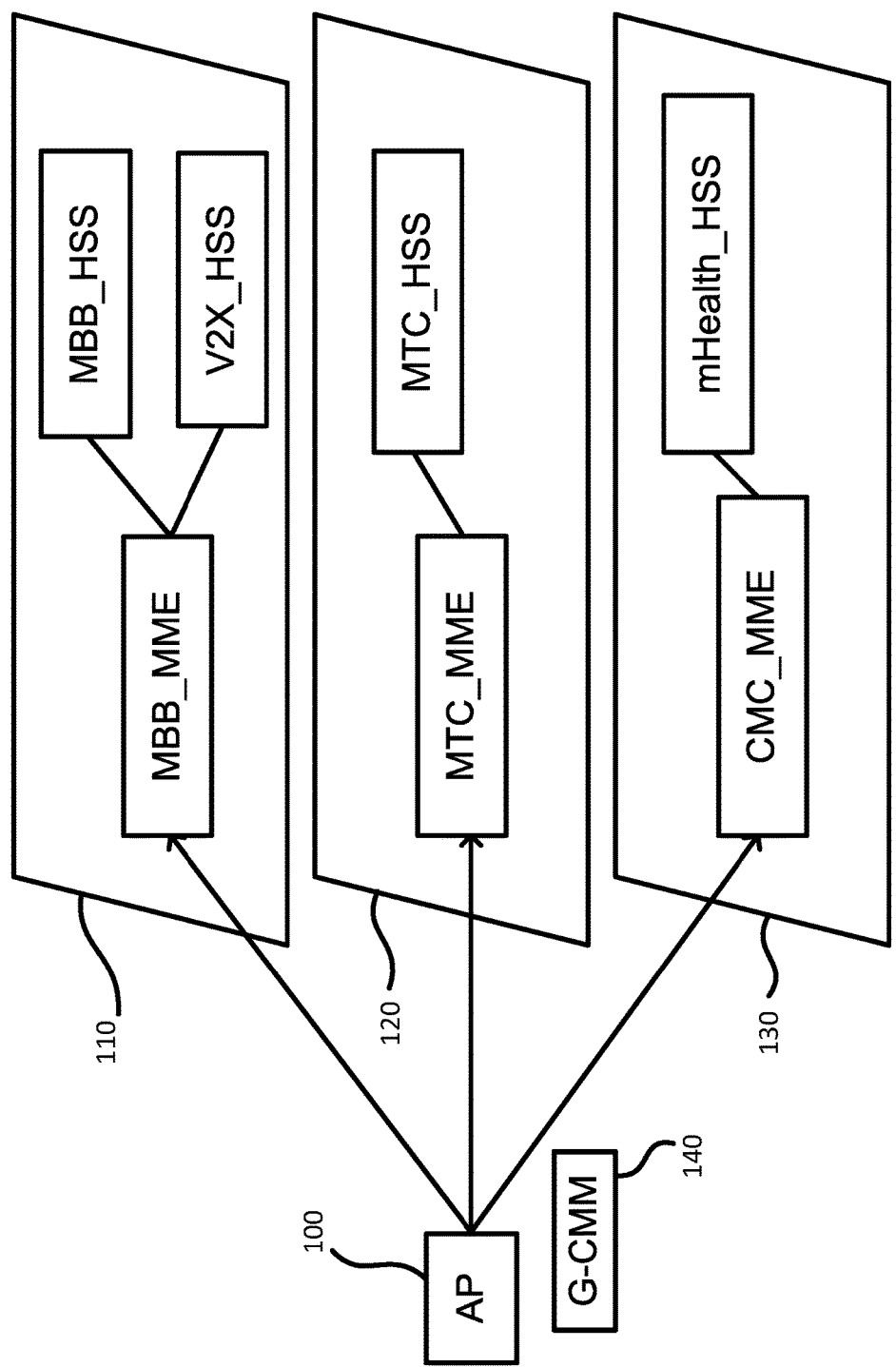
FIG. 1 illustrates how multiple services received from devices served by an AP can be allocated to slices, according to an embodiment.

As used herein, a "network" or "communication network" may service various devices including but is not necessarily limited to, wireless devices. Such a network may include a radio access portion and a backhaul portion. The network may further comprise various virtualized components as will become readily apparent herein. A primary example of such a network is a 5G network, which is reconfigurable and capable of network slicing, as described below.

Network slicing refers to a technique for separating different types of network traffic which can be used in reconfigurable network architectures, such as networks employing Network Function Virtualization (NFV). A network slice (as defined in 3GPP TR 22.891 entitled "Study on New Services and Markets Technology Enablers") is a collection of logical network functions that supports the communication service requirements of a particular network service. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

Network slicing allows the instantiation of separate network slices respectively directed toward different network services. This allows for separation of different types of traffic, the different types of traffic potentially having different packet processing requirements and QoS requirements. Network slices may correspond to the allocation of pooled resources to offer different services to different customers, or groups of customers. The different services are supported by different customized virtual networks, where the different customized virtual networks are substantially separate from one another from the customer's point of view though they may share common physical network resources. The pooled resources may be commercial off-the-shelf hardware components capable of configuration through virtualization approaches, such as NFV, in order to support various network functionalities for supporting the operations of the network slices.

The NFV framework can be used to define a plurality of virtual network functions (VNFs), each of which can correspond to a function enabling the operation of a communication network. For example, a VNF can provide the functions of a router, switch, gateway, firewall, load balancer, server, and the like. The function is virtualized in the sense that it may utilize a set of virtual resources, such as computing, storage, and networking resources supplied by processing elements of a general purpose computing device, rather than utilizing dedicated hardware resources for each function. As such, VNFs may be instantiated on one or more processing elements on an as-needed basis using available virtual resources. NFV architecture is described, for example, in ETSI GS NFV 001 entitled "Network Function Virtualization (NFV); Use Cases", October 2013, and ETSI GS NFV 002 entitled "Network Function Virtualization (NFV); Architectural Framework", October 2013. In some aspects, the VNFs may be instantiated across a plurality of processing elements, at least two of which are at different physical location locations within the network. Accordingly, the VNFs may "extend" across multiple physical processing elements in a coordinated fashion to provide physical extension of the functions.

Examples of network services which may be offered include, for example: a Mobile Broadband (MBB) service, which can be suitable for web surfing but for which latency and redundancy are not typically considered critical features; a static Machine Type Communication (MTC) service which does not require high mobility support (e.g. for smart meters); and critical machine-type communication (CMC) services (for example eHealth/mHealth for providing real time health care information, possibly in emergency situations or to moving ambulances, smart grids, etc), which require mobility support.

In some embodiments, an enhanced MME, which can also be referred to as a connectivity manager, can be configured for a service and can be allocated to each slice. Accordingly, different network slices can be differentiated by the type of MME that is used to support the virtual network. For example, some services do not require mobility support, while other services may require mobility support, but may be differentiated by the degree of mobility support and reliability required. For example, the typical consumer who surfs the web while on a bus or walking will not require (or be willing to pay for) the ultra-high reliability/mobility that may be needed for medical diagnostic equipment in a moving ambulance, which requires what may be called an eHealth level of support. As examples of different slices relying upon different MME, a Mobile Broadband network slice may use a MBB_MME, a static MTC network slice may use a MTC_MME, and a CMC slice may use a CMC_MME.

When a user equipment (UE) sends an Attach Request, the network must select an appropriate slice for the UE. Note that the term UE generally denotes a wireless device, which can be a phone, tablet, mobile computer or other wireless device typically associated with a user, as well as other wireless devices which communicate with the network such as smart meters, which may not be user specific.

A slice association function (SAF), also called a slice selection function (SSF), selects the appropriate network slice based on the information in the UE's Attach Request. The SSF can be located at the Access Node (AN) or on another network node (physical or virtual) located somewhere else in the core network. In either case the network node provides processing elements, memory, Input/Output and storage as required to execute the SSF and provide communications with other network nodes and network functions operative on the core network. The AN would further include a wireless access interface to communicate with UE connecting to the network through the AN.

To facilitate such an action, the instantiated network slices can be configured with an exposed interface from the slice specific MME to enable the slice selection and forwarding of the Attach Request. In some embodiments, assuming sufficient capacity, multiple services having similar characteristics can be instantiated on the same network slice. In some embodiments, one or more MMES of the same type can be used for a slice offering multiple services having similar characteristics or requiring similar performance. In this case, the same MME type is used for each network service. However, adding multiple services to the same network slice may add to the complexity of the configuration. In order to reduce the complexity of the configuration when there are multiple network services associated with the same network slice (MME type), a network operator may prefer to instantiate multiple network slices of the same type.

In some embodiments, a common MME (i.e. one that is not type-specific) can be used for a slice which supports multiple service types. However, relying on a common MME to support multiple service types adds complexity to the MME. The network slice selection procedure can be simplified by using a type-specific MME (i.e. one MME type per network slice). Using a type-specific MME also simplifies the network attach procedure for the UE. The SSF can be performed by the Global Connection and Mobility Management entity (G-CMM), which can be located at the Access Point (AP).

FIG. 1 illustrates an embodiment of an AP 100 allocating multiple services received from UE to slices. In FIG. 1, three different slices are shown, with the top slice 110 configured for an MBB service, the middle slice 120 configured for an MTC service, and the bottom slice 130 configured for a CMC service. Accordingly, an enhanced MME for each service type is allocated to each slice and service-specific functions may be instantiated to support that network slice. For example, the service-specific Home Subscriber Server (HSS) and other VNFs can be instantiated on the same network slice: an MTC_HSS is allocated for the MTC slice; an mHealth_HSS is allocated for the CMC slice; and both an MBB_HSS and a V2X_HSS are allocated for the MBB slice (if a vehicle-to-everything else (V2X) application is used). It should be noted that other functions (not shown) for operating each slice can be instantiated, which in an LTE network can include, for example, PCRF, P-GW and S-GW or similar functions as well as Authentication, Authorization and Accounting (AAA) functions. In some embodiments, enhanced Policy Control and Charging functions (PCC) can replace the PCRF and PCEF. The path computation and configuration within a network slice is performed by a slice-specific Flow Management (FM) VNF (not shown). FIG. 1 also illustrates a G-CMM function 140 associated with the AP 100, which will be discussed in more detail with reference to FIG. 4.

Figure 2:
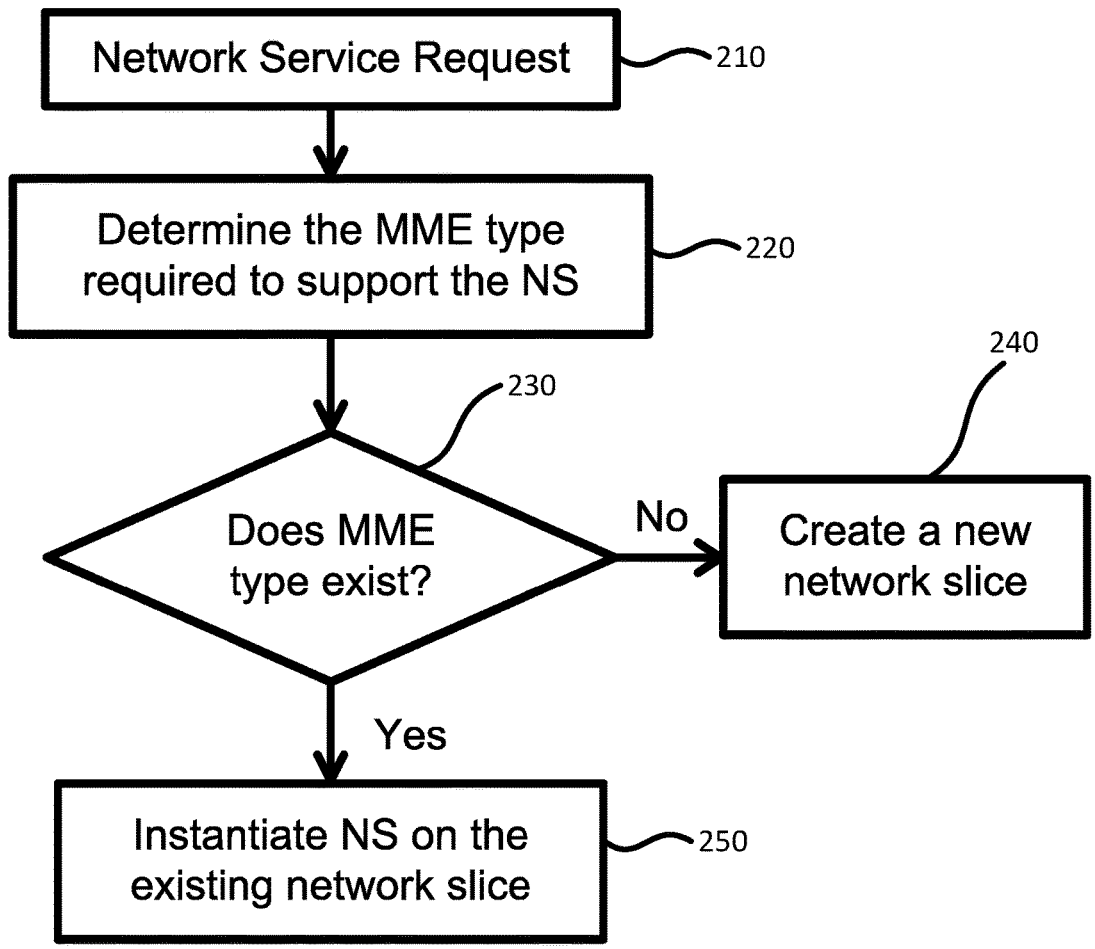
FIG. 2 is a flowchart illustrating Network Service Instantiation Procedure according to an embodiment.

FIG. 2 is a flowchart illustrating an embodiment of a Network Service Instantiation Procedure within a network slice. In step 210 a Network Service (NS) Request is received. In some embodiments, this request is forwarded to, and received by, a Global Customer Service Manager (G-CSM). In step 220 the G-CSM evaluates the request and determines the MME type required to support the NS. In step 230 the G-CSM determines whether an MME of the appropriate type already exists for an existing slice. If the MME type does exist, then in step 230 the NS is instantiated on the existing network slice. For example, the G-CSM sends instructions to the NFV Management and Orchestration (MANO) entity to instantiate the NS on the slice. If an MME of the appropriate type does not already exist for an existing slice, then in step 240 a new network slice having the appropriate MME type is created to host the service. For example, the G-CSM sends instructions to the MANO to create a new slice and to instantiate the NS on the slice.

Figure 3:
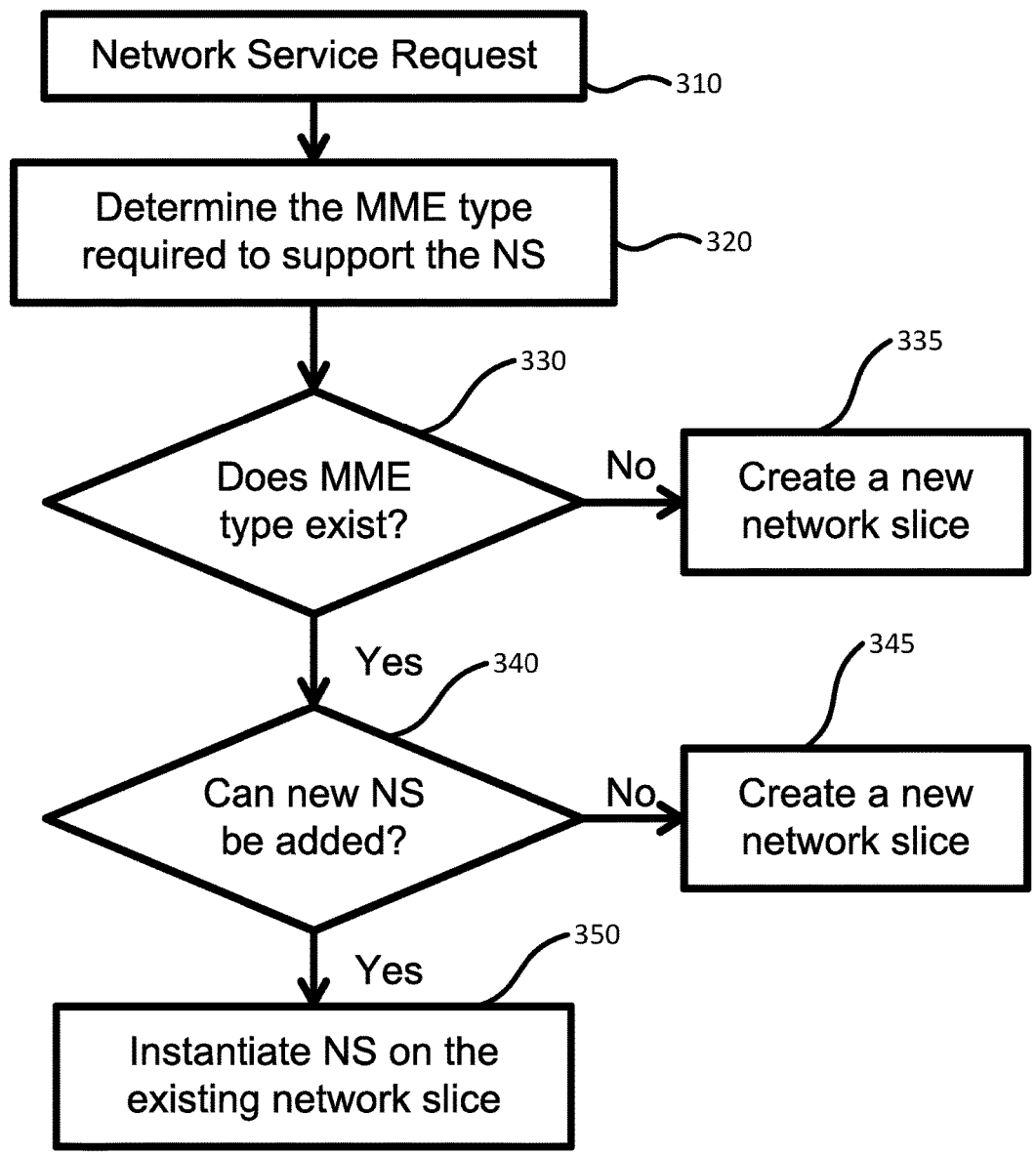
FIG. 3 is a flowchart illustrating Network Service Instantiation Procedure according to another embodiment.

Referring to FIG. 3, in another embodiment, an alternate Network Service Instantiation Procedure can be used to take into account the complexity of adding the new NS request onto an existing network slice. Similar to the procedure of FIG. 2, in step 310 an NS request is received. In some embodiments, this request is forwarded to, and received by, a Global Customer Service Manager (G-CSM). In step 320 the MME type required to support the NS is determined. In step 330 it is determined whether an MME of the appropriate type already exists for an existing slice. If the required MME type does not exist, then in step 340 a new network slice having the appropriate MME type is created. If the MME type does exist, then a second determination is made in step 340 to evaluate whether the NS can easily be added to an existing slice. If the NS cannot easily be added to an existing slice, then in step 345 a new network slice having the appropriate MME type is created. For example, the NS may not be easily added if the existing slice may not have excess capacity, or the NS requires additional service-specific VNFs not available on the existing slice and adding the service-specific VNFs would increase the network configuration complexity. If the NS can be accommodated on the existing network slice, then in step 350 the NS is instantiated on the existing network slice.

In some embodiments, network slicing relates to the ability of a network, such as a 5G communication network accessible by wireless devices, to provide multiple logical network slices on demand, with each network slice operating as a substantially separate network for different market scenarios which demand diverse requirements. The capabilities and operating parameters of each network slice may be customized to the service requirements. Configuration of the network slices may be based on software defined networking, network function virtualization and network orchestration.

According to embodiments of the present invention, the communication network architecture is based on a NFV framework. The MANO is used to instantiate the necessary network functional components in order to suitably provide the service identified by a NS request. The network service can be described by a Network Service Descriptor, which is a deployment template for instantiating the NS. The NSD contains a Virtual Network Function Forwarding Graph (VNFFG), which defines the set of network functions that are required to provide the requested service. The VNFFG contains a Network Forwarding Path (NFP) that defines a sequence of actions that are to be performed, for example by a collection of VNFs, to provide the requested service.

Figure 4:
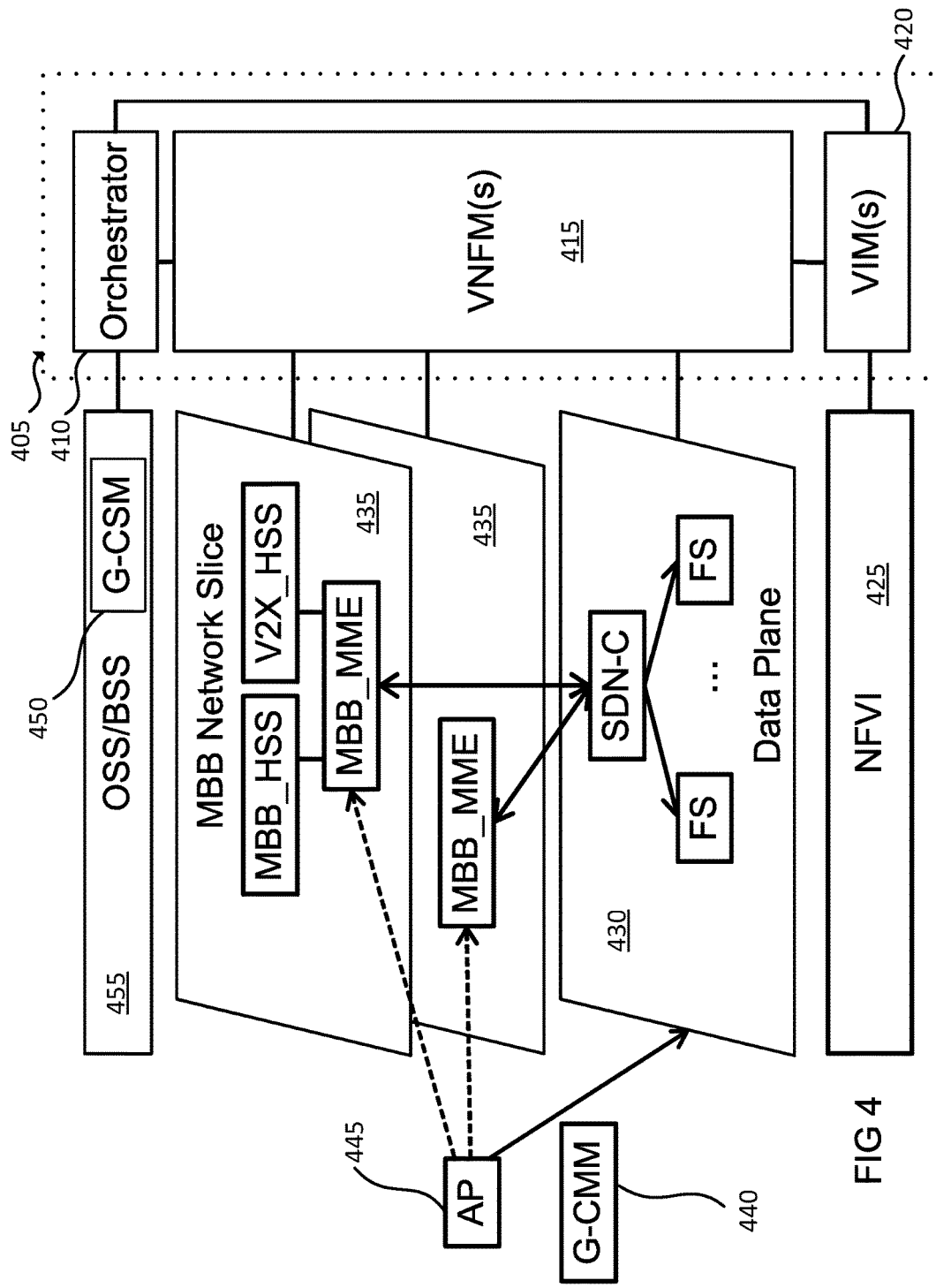
FIG. 4 illustrates an overview of the communication network architecture in accordance with embodiments.

FIG. 4 illustrates an overview of an embodiment of a communication network architecture. The NFV-MANO entity 405 includes an Orchestrator function 410, a Virtual Network Function Manager (VNFM) function 415 and a Virtual Infrastructure Manager (VIM) function 420. According to embodiments, the functionality of the Orchestrator 410, VNFM 415 and VIM 420 functions can be as defined in ETSI GS NFV 001 and ETSI GS NFV 002, for example.

According to embodiments, the VIM function 420 is configured to manage the Network Function Virtual Infrastructure (NFVI) 425 which can include physical infrastructure, virtual resources and software resources in an NFV environment. For example, physical infrastructure can include servers, storage devices and the like and virtual resources can include virtual machines. According to embodiments, there can be plural VIM functions 420 within a particular NFV architecture, wherein each VIM function 420 is responsible for the management of its respective NFVI 425.

According to embodiments, the VNFM function 415 can be configured to manage the VNFs and can manage their lifecycle. For example, the VNFM function 415 can create, maintain and terminate VNF instances, which can be installed on virtual machines that are created and managed by the VIM function 420. The VNFM function 415 can also be configured to provide fault, configuration, accounting, performance and security management (FCAPs) of the VNFs. In addition, the VNFM function 415 can be configured to scale-up and scale-down one or more of the VNFs, which can result in the scaling-up and scaling-down of the usage of the central processor(s) that is providing the computational power for the realization of the VNFs. In some embodiments, each VNFM function 415 manages a separate VNF or a single VNFM function 415 manages multiple VNFs.

According to embodiments, the Orchestrator function 410 can be configured to coordinate, authorize, release and engage the NFVI 425 resources by interaction with the VIM function 420. The Orchestrator function 410 is further configured to create end to end service between different VNFs by interaction with the VNFM function 415. As will be discussed, embodiments provide an enhanced MANO, and in particular enhanced Orchestrator functionality for allocating network service requests to different types of services.

With further reference to FIG. 4, a plurality of network slices and a shared data plane in accordance with embodiments of the present invention are illustrated. The global Data Plane 430 includes a Software Defined Networking (SDN) controller (SDN-C) for controlling data flow across multiple and potentially all network slices. The shared Data Plane may be regarded as a separate network slice in some embodiments. A plurality of MBB network slices 435 are illustrated, but it should be appreciated that other types of network slices can be accommodated. A shared Control Plane (not shown) can be used for mobility management across multiple slices.

FIG. 4 also includes a G-CMM function 440 associated with the AP 445. The G-CMM function 440 includes the SAF/SSF discussed above for initial association to a network slice. In more detail, the G-CMM function 440 is responsible for maintaining a list of the instantiated network slices and the parameters associated with each network slice (e.g. Operator ID, service type, etc.). Alternatively, the information related to the instantiated network slices may be included in a Network Slice Instances Repository, which can be accessed by the SAF/SSF. The repository can be maintained by the NFV-MANO as part of the lifecycle management of the network slices (instantiation, updated and termination). The information in the repository may include, but not limited to, the network slice ID, the shared sub-network ID and the isolated sub-network ID. Examples of a G-CMM function are discussed in U.S. Application No. 62/220,643, filed Sep. 18, 2015, which has been incorporated by reference. It should be appreciated that while the G-CMM 440 is shown associated with the AP 445, at least some aspects of the G-CMM function 440 can be instantiated at another location within the network architecture.

In embodiments, the network architecture further includes a G-CSM function 450 which is configured to receive the NS Requests and send a request to the Orchestrator function of the NFV-MANO entity to accommodate the NS Request. In certain embodiments, the G-CSM function 450 may, after receiving a customer service request, determine if a new network slice should be instantiated, or if the request can be accommodated on an existing slice. The G-CSM function 450 may also provide further functionality across multiple network slice (e.g. for keeping track of charging, billing, across multiple or potentially all network slices). In some embodiments, the G-CSM function 450 is also responsible for maintaining a pool of Customer Service Management (CSM) functions, wherein each CSM function is instantiated as a local or network slice-specific function. CSM functions may be service-specific, and may include charging, QoE control, and UE context management related to charging and QoE.

The G-CSM function 450 can be configured to monitor network slices and provide feedback to the Orchestrator function 410 about the performance of a network slice, thereby enabling optional fine tuning of the network and computing resources, as managed by the VNFM 415 and VIM 420 functions.

According to embodiments, the G-CSM function 450 can be functionally integrated within the Operational Support System/Business Support System (OSS-BSS) 455. The OSS can include functions that support back-office activities which aid in operating a communication network, as well as provision and maintain customer services and the like. The BSS can include functions that support customer-facing activities, for example billing order management, customer relationship management, call centre automation and the like. In this embodiment, the G-CSM function 450 can communicate with the Orchestrator function 410 using the Os-Ma-nfvo interface, which provides communication between the OSS-BSS 455 and the Orchestrator function 410.

According to some embodiments, the G-CSM function 450 can be instantiated within the network but external to the OSS-BSS 455. In this configuration, another interface, which is not defined within the NFV framework, is configured in order to provide communication between the G-CSM function 450 and the Orchestrator function 410.

In addition to implementing the functions within the G-CMM 440 and the G-CSM 450 for supporting the allocation of an NS to an existing or new slice, some embodiments make enhancements to the Orchestrator entity, which will now be discussed.

As will be understood by those skilled in the art, one issue that has motivated the currently disclosed solutions is to reduce the complexity of configuring services that an operator may want to add to existing network slices. Added flexibility for the operator that does not add complexity to the configuration of a UE that requests services from different network slices is also desirable for operators, although there may be an acceptable trade-off between network configuration complexity and UE configuration and operational complexity.

The Next Generation Mobile Network (NGMN) Alliance (often simply referred to as NGMN) is an association of different research institutes, network operators and telecommunication networking equipment manufacturers. NGMN has set out to provide high level definitions of network slices. These definitions refer to network slice blueprints as a template from which network slices can be created. A blueprint can be composed of a plurality of sub-network blueprints. An instance of a sub network can be shared between multiple network slices.

Using these NGMN definitions, it may be advantageous, to decouple the MME from the other network functions in a network slice. By decoupling the MME from a network slice, a UE that connects to a mobile network is able to connect to a single MME, but multiple network slices. The UE is able to connect to different network slices when the UE wants to access services that are only offered on those different network slices, while maintaining connection to the same MME. By only using a single MME connection, the UE configuration is simplified, and both signaling and power consumption at the UE may be reduced. Where all the services are provided in different network slices of a single RAN, the mobility of the UE with respect to the different network slices should be effectively the same, meaning that a single MME can serve the UE needs (e.g. if, from the perspective of a first network slice, the UE is moving, it will also be moving from the perspective of entities in the second network slice).

By serving a UE with a single MME, but allowing the UE to connect to different network slices, a network operator may be able to avail itself of flexibility that would otherwise not be possible. As new services are introduced (e.g. different traffic scenarios), an operator is provided the opportunity to decide whether the new service should be integrated into an existing network slice, or whether a new network slice should be created. This decision does not need to take into account the complexity and resource costs of creating and maintaining a new MME instance, and instead the decision can be made based only on the configuration complexity and the benefits associated with a separate network slice.

Because a single MME can be used by a UE, an operator is relieved of the obligation to create all functions used by a network slice in each and every network slice. Operators do not have to determine all the possible combinations of services that are required for each UE in each network slice. Instead, slices can be configured to satisfy the performance requirements of the services that are provided by the slice. A UE may attach to one MME, but can access services that are provided by different slices.

It will be understood to those skilled in the art that there will likely be a need for network slices that support different levels of mobility, and that there may be requirements to provide the support for these different levels of mobility on demand. One solution is to overprovision each network slice to support a number of different mobility profiles in an MME or in separate MMES. If a separate network slice is created for each MME-type then a proliferation of the number of network slices may result, imposing additional demands on the network operator.

To avoid the proliferation of network slices, the MME, and possibly other functions, can be decoupled from the network slices. With the decoupling of functions from network slices, the question of how to create network slices arises. One mechanism is to create a plurality of MMEs, and copy the MMEs into the required network slices. When a UE attaches to a network and connects to an MME (typically to an MME selected to support a UE mobility profile) the MME would already be resident in each network slice. Although this may address one of the problems, it does so at the cost of repeating the mobility tracking procedures for the UE (e.g. location update and tracking area update) when the UE is attached to multiple slices, increasing required resource allocation and communication bandwidth for tracking procedures.

Figure 5:
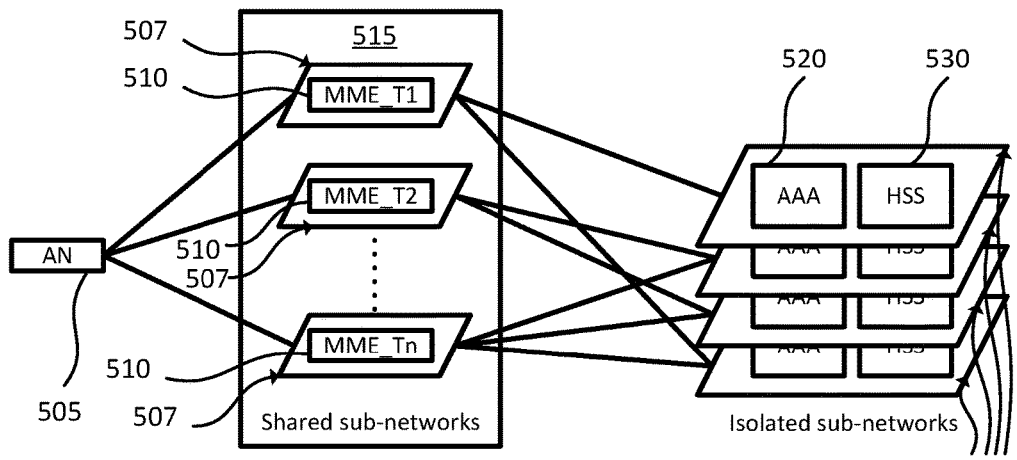
FIG. 5 illustrates an architecture for arranging sub-networks for network slice creation according to an embodiment.

FIG. 5 illustrates an exemplary network slice creation and management architecture that can take advantage of the decoupling of resources that may be commonly used across network slices. As shown in FIG. 5, an Access Node (AN) 505 is used by a UE (not shown) to connect. The UE is connecting to obtain a service that is offered in one of the illustrated sub-networks.

The network maintains a number of different shared sub-network instances 507; each shared sub-network instance 507 can support a different UE mobility profile and includes a pool of MME instances 510. Each of the sub-network instances 507 can be isolated from other sub-network instances 507, and form a set of shared sub-networks 515. Each sub-network instance 507 can support a different mobility profile as supported by its MME 510, and can connect to any or all of the isolated sub-networks 535 that are used to support the different services. As illustrated in FIG. 5, elements such as authentication authorization and charging, performed by the AAA 520, and subscriber information management, provided by the HSS 530, can remain in the isolated sub-networks 535 along with the other virtual functions that are used to support the service. Alternatively, the authentication/authorization and subscriber information may also be located in the shared sub-network containing the MME.

When a UE attaches through the Access Node (AN) 505, it connects to one of the MMES 510, and the MME 510 then connects to any of the sub-networks that the UE requires. The path from the AN 505, through a given MME 510 to any of the service oriented sub-networks 535 forms a network slice that provides service isolation. The UE is typically paired to a single MME 510 for all network slices supported by the same network operator. Because the UE assignment to an MME 510 is based, at least in part, on the mobility profile of the MME 510, the UE will be connected to an MME 510 that can support its needed mobility profile in all connected network slices.

It should be understood that it is not required for each shared sub-network 507 to be able to connect to each isolated sub-network 535. If the shared sub-network 507 includes an MME 510 that does not support device mobility (i.e. restricted mobility) (e.g. an MME 510 designed to support the UEs in a sensor network or in a metering network, which are not designed for mobility), then it would make little sense for that shared sub network 507 to connect to an isolated sub-network 535 that supports a vehicle-to-vehicle service that requires high mobility. Thus, a UE will be connected to a shared sub-network 507 that supports both the UE profile and can be connected to the isolated sub-network 535 that the UE will obtain services from.

Those skilled in the art will appreciate that the architecture of FIG. 5 allows for the creation of a pool of MMES 510 that can support the same mobility profile. It should be further understood that each shared sub-network 507 may have a plurality of different MMES 510 supporting the same profile so that no instance of an MME 510 is overwhelmed by traffic volume. This allows each MME type to be included in a separate sub-network blueprint. The creation of a network slice becomes the instantiation of a composite network slice blueprint. The MME 510 effectively becomes a function in a shared sub-network 507 that can be incorporated into the network slice.

It should be understood that there are other functions, like the MME 510, that may be candidates for inclusion with the MME 510 on a shared sub-network 507. Conversely there are other functions that may be better left in the isolated sub-network 535. In one example, if every isolated sub-network 535 has a different authentication process (or if a sufficient number of the isolated sub-networks 535 have different processes for the AAA function 520), it may be a better design decision to leave the AAA 520 and HSS 530 in the isolated sub-network 535 (as shown in FIG. 5).

There are some network-specific functions, such as charging functions, that may have rules that are specific to the services supported within an isolated sub-network 535. In an aspect the isolated functions with isolated sub-network specific rules replicated within each individual isolated sub-network 535 as there is no reduction in complexity gained by decoupling network-specific functions (e.g. AAA 520 and HSS 530) from the isolated sub-network 535.

Figure 6:
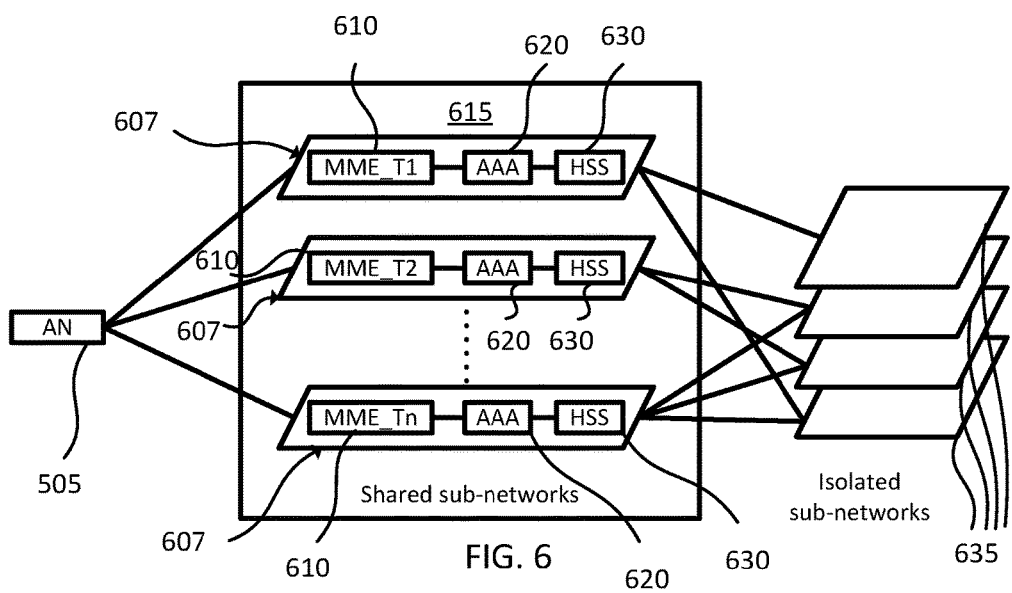
FIG. 6 illustrates an architecture for arranging sub-networks for network slice creation according to an embodiment.

FIG. 6 illustrates an exemplary network slice creation and management architecture where the HSS 630 and AAA 620 functions are moved into the shared sub-networks 607 along with the MME 610. As with the architecture of FIG. 5, the resources that are common (and follow common rules) are moved to the shared sub-networks 607, which can enable a simpler configuration of the isolated sub-networks 635. The isolated sub-networks 635 can then be used to house the functions that are specific to their network slice. This illustrates a further decoupling, not just of the MME 610, but of control plane functions in general, from the service oriented network slice. As before a network slice is created through the combination of a shared sub-network 607 with one of the isolated sub-networks 635 to which it is attached.

While FIG. 6 does not illustrate any services in the isolated sub-networks, each isolated sub-network 635 can still support one or more services where desired. Furthermore, the number of shared sub-networks 607 and the number of isolated sub-networks 635 can be independent of each other (they need not be matched in number and either one can be greater in number than the other.

It should be understood that although FIG. 5 indicates the decoupling of the MME 510, and FIG. 6 indicates the decoupling of the MME 510, AAA 620, and HSS 630, any number of functions that are common to the network slices can be decoupled. Furthermore, the MME 510, AAA 620, and HSS 630 are network elements commonly used in LTE wireless networks. Next generation wireless networks may have different network elements to perform these functions such as MM, AU, and subscriber repositories. The present application relates generally to the decoupling of network functions common to network slices, and should not be limited to the exemplar functions described herein for illustrative purposes. As noted above, it may be preferable to not move functions which follow different rules (e.g. charging functions) into the same sub-network as the MME 610.

Those skilled in the art will appreciate that the ordering of the AAA 520, 620 and HSS 530, 630 illustrated in FIGS. 5 and 6 should not be interpreted as being indicative of the order in which the AAA 520, 620 and HSS 530, 630 are to be accessed. The order of the positioning of the functions is for illustrative purposes only and does not indicate an order of operations.

Figure 7:
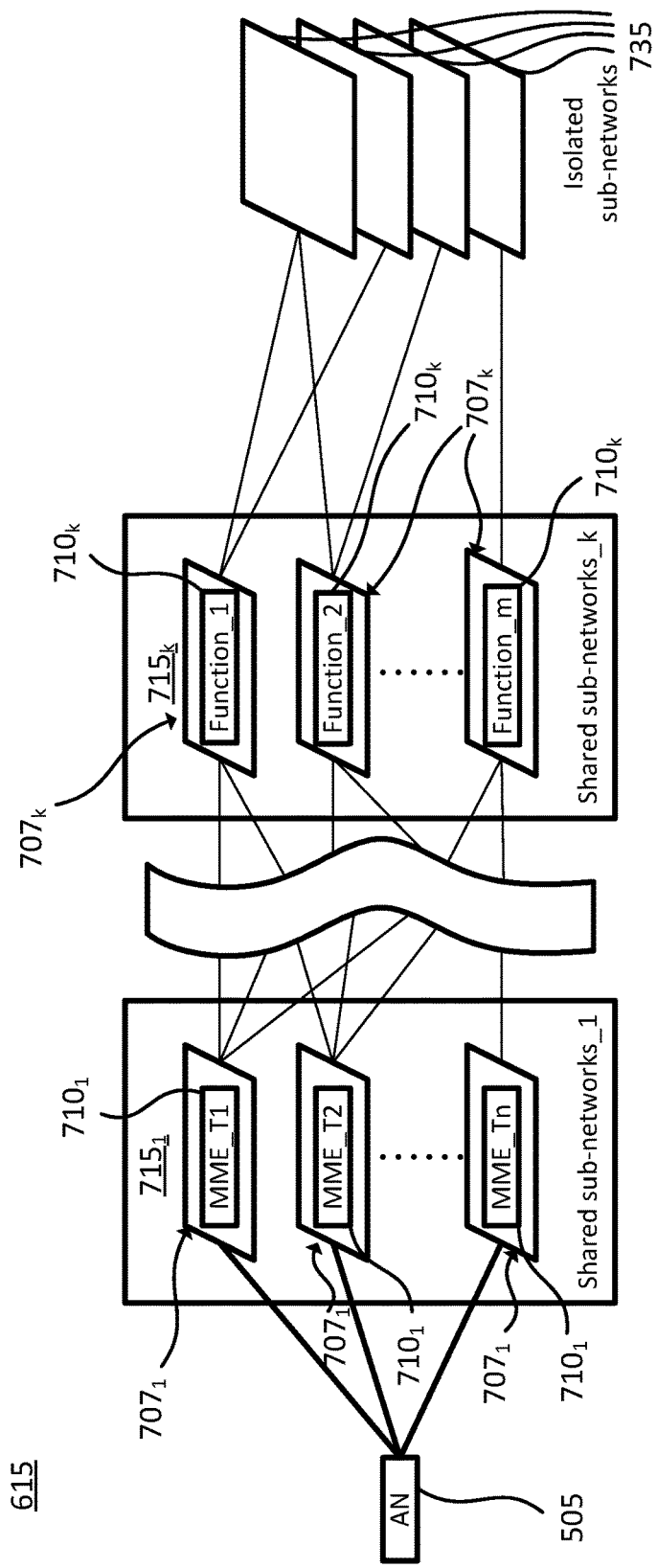
FIG. 7 illustrates an architecture for arranging sub-networks for network slice creation according to an embodiment.

FIG. 7 illustrates an embodiment of a network slice creation and management architecture in which different common functions can be extracted from the isolated sub-networks, but to maintain the maximum flexibility different classes of function are separated into different groupings of shared sub-networks. Referring to FIG. 7, the isolated sub-networks 735 are shown without internal functions for simplicity, though functions which follow different rules (e.g. charging functions) may be preferable to leave in the isolated sub-networks 735. In the embodiment of FIG. 7 the k sets of shared sub-networks $707_1$, $707_k$ allow the flexibility of providing selected groupings of functions $710_1$, $710_k$ for each UE. This increases the variety of different shared service combinations that can be selected. It should be noted that although the MME $710_1$ is illustrated as one of these extracted functions, this is solely for the purposes of this example and should not be considered a requirement. It should be further understood that a network slice is created by selecting from the available shared sub-networks $707_1$, $707_k$, but it may be possible to not select particular classes of shared sub-networks $707_1$, $707_k$ if a particular function is not required for the network slice. In this fashion slices may be created with only the functions necessary for each slice.

The following describes the slice association procedure and how the UE can attach to multiple slices simultaneously. Three different network slice configuration options are described. These can be summarized as:

No shared functions between network slices;
Some Control Plane (CP) functions are shared between network slices (e.g. mobility management NFs). Other CP functions are isolated. The User Plane (UP) functions are also isolated for each network slice.
An entire CP containing a set of CP NFs are shared between network slices. Only UP functions are isolated.

An operator may use different configuration options for different network slices. In this case, a unified network slice association procedure is required.

With respect to 3GPP standards, a new function to perform the network slice association/selection decision should be specified. This function can be integrated within the 5G AP, or it can be implemented as a separate function instantiated elsewhere in the core network. This function, can be a part of an enhanced MME that is instantiated within a common network slice (i.e. all UEs first attach to a common slice which can then be switched to another network slice after processing the Attach Request). Each network slice has only one MME type.

With respect to ETSI NFV standards, the Management and Orchestration (MANO) entities can be enhanced to support network slicing (e.g. including a network slice orchestrator). The network slice orchestrator can dedicate resources (compute, storage and networking) to the different network services. If radio access resources are a part of the network slice, then the RO can also allocate radio access resources. The resources repository can be extended to include network slice information (i.e. the resource allocation information must include the network slice ID). The VIM can be able to keep track of the Network Slice ID and the resource allocation quota assigned to the Network Slice. The quota specifies compute, storage and networking resources. It may also include access radio resources.

The examples in FIGS. 8, 9, 10, 11A, and 11B illustrate two different UEs, an MTC UE and a V2X UE, that are associated to different slices. The MTC UE is only associated with the MTC slice. The V2X UE is associated with an eMBB slice and a URLLC slice.

Figure 8:
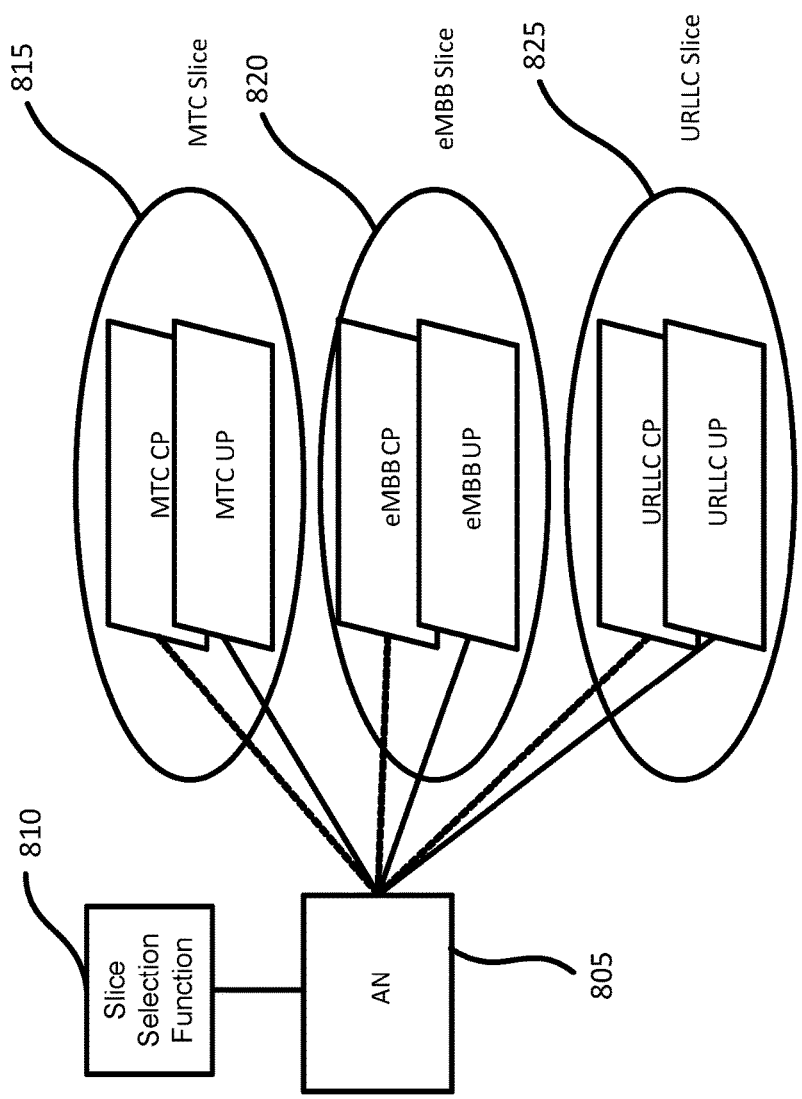
FIG. 8 illustrates an architecture for a plurality of slices network according to an embodiment.

Referring to FIG. 8, an embodiment of a slice selection function is illustrated.

In the embodiment of FIG. 8, a UE may be operative to attach to one or more network slices by connecting and sending one or more network slice attach requests to an AN 805. In the aspect of FIG. 8, the AN 805 may be operative to forward the one or more network slice attach requests to a Slice Selection Function (SSF) 810. The forwarded one or more network slice attach requests may each include UE subscription information, UE usage type, a UE identifier, and other information the SSF 810 may use to associate the requesting UE with a corresponding one or more network slices 815, 820, 825. In the embodiment of FIG. 8, each network slice 815, 820, 825 has its own corresponding UP and CP. Accordingly, there are no shared network functions between the network slices 815, 820, 825. In this embodiment, the SSF 810 will return a CP NF identifier and a UP NF identifier corresponding to each of the associated one or more network slices 815, 820, 825.

Figure 9:
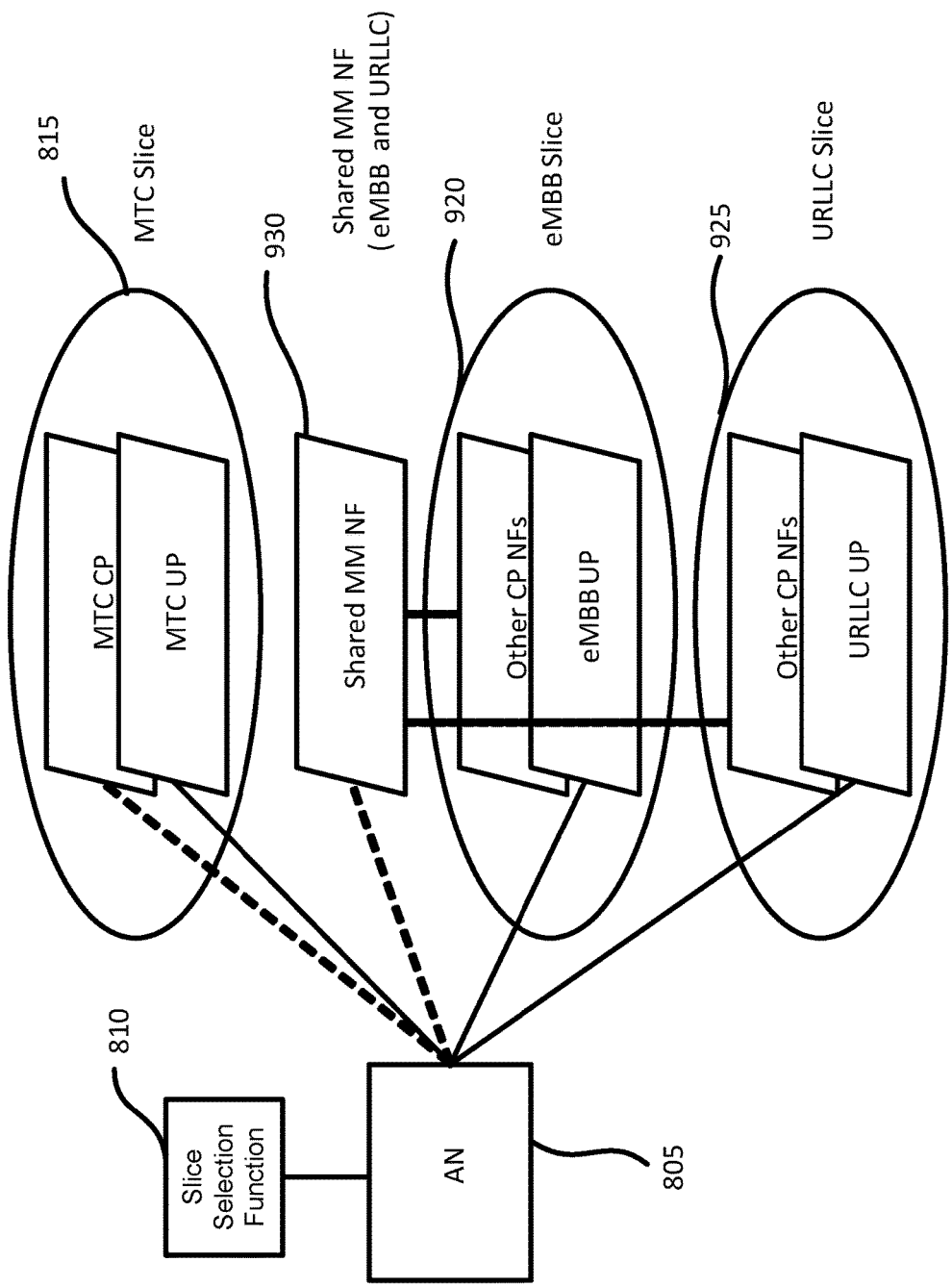
FIG. 9 illustrates an architecture for a plurality of network slices having a shared MM CP NF according to an embodiment.

Referring to FIG. 9, at least two network slices 920, 925 may share a common Mobility Management Control Plane Network Function (MM CP NF, or just "MM NF") 930. The CP may be a combination of different sub-networks each having a set of CP NFs.

In the example of FIG. 9, the MTC slice 815 is isolated from the other two slices (eMBB slice 920 and URLLC slice 925). The eMBB slice 920 and URLLC slice 925 share a common set of CP NFs through the shared MM NF 930. As indicated, the network slices 920, 925 may also have some isolated CP NFs as may be required.

The shared CP NFs, in this example, contain mobility management functions (MM) and may also contain other CP functions. For example, NFs for authentication and charging may also be shared if they are common to several slices. If the authentication and/or charging functions are network slice specific, then they can be instantiated in the isolated sub-network of the corresponding network slice. In order to isolate the traffic for each network slice 815, 920, 925, the UP NFs are instantiated within the isolated sub-networks of the corresponding network slice 815, 920, 925.

In one embodiment, in order to reduce the complexity for the UE, it can be assumed that the UE can only be associated with one MM NF. However, the UE may be associated with multiple network slices. In the example of FIG. 9, a UE that is associated with the first network slice cannot be associated with another slice, because connecting to another slice would require the UE to establish a connection to a different MM NF. A UE that is connected to a shared MM NF can, however, connect to the eMBB slice 920 and URLLC slice 925 as they have a common shared MM NF 930. This configuration may be used for slices that are targeted for low cost devices (e.g. MTC devices) which may use simplified network functions and therefore cannot establish connections with multiple MM NFs and cannot access services provided in other slices.

When a UE first sends an Attach Request to the Access Node (AN) 805, the AN 805 forwards the request to the Slice Selection Function (SSF) 810. Based on the UE's subscription information, UE usage type and service type, the slice selection function 810 associates the UE to one or more slices.

If the UE can only attach to one slice, then the SSF 810 selects a CP NF for setting up a CP interface and a UP NF for setting up a UP interface. Otherwise, if the UE is capable of attaching to multiple slices then there are two options. In option 1, the SSF 810 can select a UP NF that will have a connection to the AN 805 for each network slice. In option 2, only a default or UE-specified UP connection is setup during the attachment procedure. The UE can specify the UP connection to a specific network slice using a service type ID in the UE's Attach Request. In this case, the UE can attach to the second slice after the attachment procedure by sending a service request.

In this embodiment, if a UE transmits a request to attach to a network slice that makes use of the shared CP NF, then the SSF 810 can indicate that the CP is a combination of the subnet with the shared CP NFs and the isolated CP portion in the slice. The slice identifier may include both a CP and an UP identifier. For instance, as illustrated in FIG. 9, the eMBB slice 920 and the URLLC slice 925 share common network functions. The shared CP NF is a MM NF 930 that serves both the eMBB slice 920 and the URLLC slice 925. The MTC 815 slice is a separate network slice that does not share the MM NF 930, because (in this example) the MM functions required for the MTC slice 815 are sufficiently different than the requirements for the eMBB slice 920 and URLLC slice 925. Accordingly, if the UE requests to attach to the URLLC slice 925, the SSF 810 may return the shared MM NF identifier, the URLLC CP NF identifier, and the URLLC UP identifier (or the shared MM group/pool identifier and an identifier of the URLLC slice). The shared MM NF identifier may be used by the AN 805 to establish a connection serviced by the shared MM NF 930. The URLLC CP NF identifier may be used by the AN 805 to establish a URLLC CP connection serviced by the URLLC CP NF. Similarly, the URLLC UP identifier may be used by the AN 805 as the URLLC UP entry point for URLLC traffic.

Figure 10:
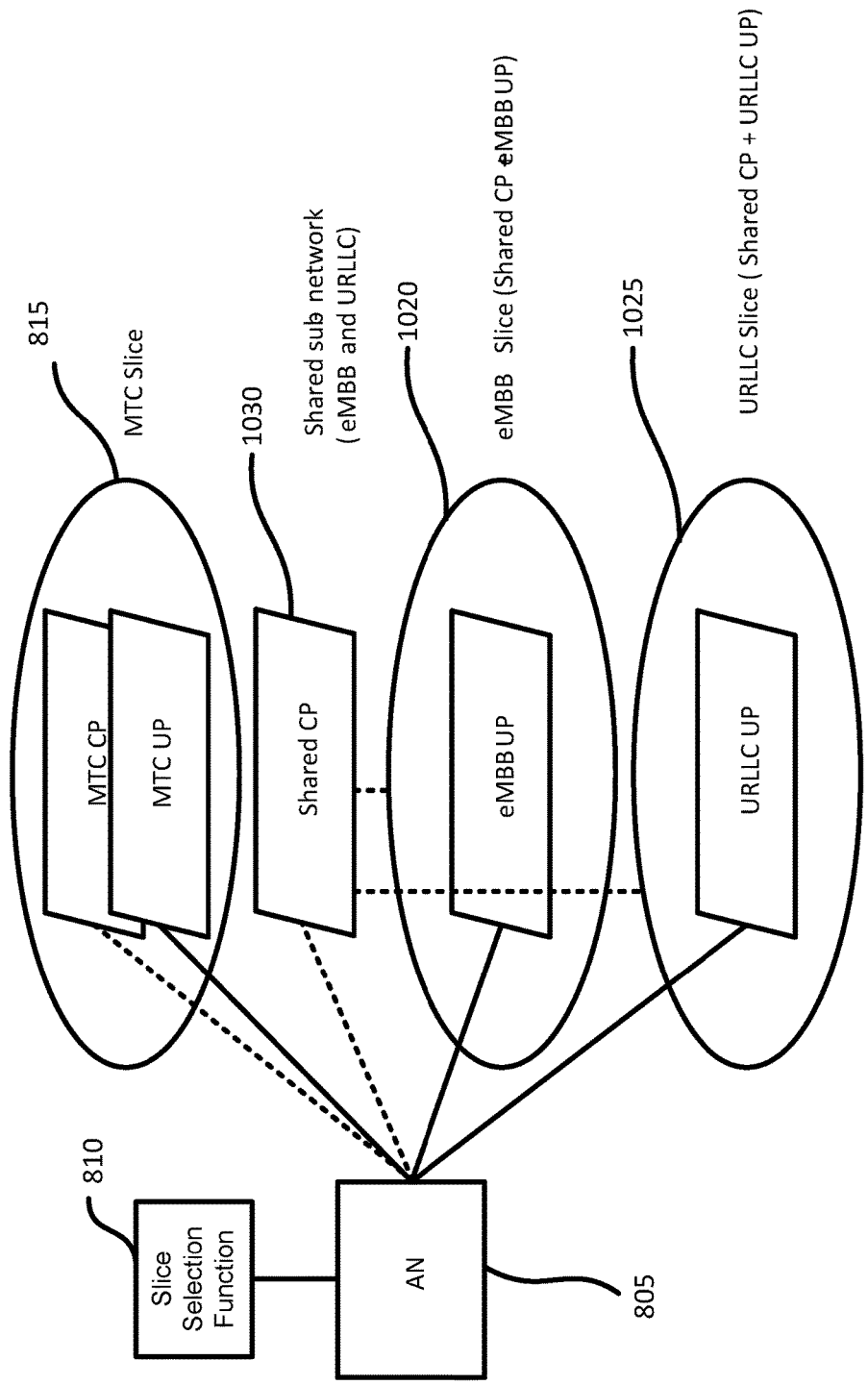
FIG. 10 illustrates an architecture for a plurality of network slices having a shared CP NF according to an embodiment.

Referring to FIG. 10, in an implementation the eMBB slice 1020 and the URLLC slice 1025 make use of a common shared CP 1030, instead of a common MM NF 930 as illustrated in FIG. 9. In the embodiment of FIG. 10, the eMBB slice 1020 and the URLLC slice 1025 each have an isolated UP, while the CP is a shared common component 1030. Accordingly, the UE will only interact with a single CP when accessing the two slices 1020, 1025. Accordingly, in the embodiment of FIG. 10, each network slice only has a single CP (either isolated or shared), so that these shared network slices 1020 1025 rely solely on the shared CP 1030 and do not have respective separate CPs. While the eMBB slice 1020 and the URLLC slice 1025 share a common CP NF, some of the network slices may have their own CP NF, such as the MTC slice 815 illustrated in FIG. 10. If a UE requests attachment to one or more of the network slices that share a common CP (e.g. eMBB and URLLC in FIG. 10), the SSF 810 only returns a single CP NF identifier, the shared CP NF identifier. The AN 805 may then use the shared CP NF identifier, along with the returned UP identifiers, such as the eMBB UP identifier and the URLLC UP identifier, to identify the UP entry point for the requested connection(s).

The examples of FIGS. 8, 9, & 10 lead to the following scenarios being supported:

In a first case each network slice has its own corresponding CP and set of CP NFs. The SSF can return the corresponding CP identifier that match the network slice attach request forwarded by the AN. Optionally, specific NFs in the CP can be identified.

In the second case at least two network slices share a CP NF, but also have their own CP NFs. This results in some CP NFs being common, and others being different between the slices. In this case the SSF can provide both the shared CP identifier (for common CP NFs) and the corresponding isolated CP identifier associated with the requested network slice (for the isolated CP NF functions).

In the third case at least two of the network slices share a CP. Neither of the slices have an isolated CP. All CP NFs for these slices reside in the shared CP. In this case the SSF can return the shared CP NF Identifier and the UP identifier for each slice.

In a final scenario, a network may comprise a hybrid or blend of options from the above three cases. Where some network slices have discrete CP NFs and UP NFs, some network slices are sharing slices that share a common CP NF but maintain local discrete CP NFs as well, and some network slices are sharing slices that only share a common CP NF with no local discrete CP NFs. In an aspect, a common shared CP NF may be shared among network slices that are a blend of the second case and the third case. Accordingly, some network slices may rely solely upon the shared CP NF, while other network slices may rely both upon the shared CP NF and local discrete CP NF's corresponding to that other slice. In one embodiment, a common CP will have a set of CP NFs. A first network slice will only comprise a UP, and will use the common CP. A second network slice will use the common CP, but will also have its own CP segment for additional functions.

In the simplest case, the UE is capable of connecting to a single network slice offered by the AN. In other cases, the UE may be capable of connecting to a plurality of network slices offered by the AN. The SSF can determine, based on the UE attach request whether the UE will attach to a single network slice, or to a number of network slices. For each slice that the UE attaches to, the SSF can provide an identification of the CP. The CP may be inside an isolated network slice, it can be a common CP, or it can be a combination of sub-networks each of which provides at least one CP NF. Each of the subnetworks can be commonly accessible, and at least one of them may reside within the network slice. In this aspect, the SSF may select a one or more CP NF's for setting up one or more CP configurations, and select a plurality of UPs corresponding to the plurality of slices to be attached. The number of CP NF's selected may further depend upon whether there is a hybrid system with shared CP NF for some CP functions, and individual slice CP NF's for other CP functions within each slice.

A limitation of not sharing CP NF's is that the UE must support having a different identity for each network slice, and maintain multiple Radio Resource Control (RRC) connections. The network must also have the capability to handle multiple MM connections for each UE, i.e. one for each network slice. This may lead to additional signaling, processing, and storage because each device is being treated as a different device by each network slice. Conversely, by sharing CP NF's, the UE only has a single RRC connection for the shared CP NF, and both the UE and the network only have to manage the mobility and RRC connection per device, rather than per accessed network slice.

Figure 11:
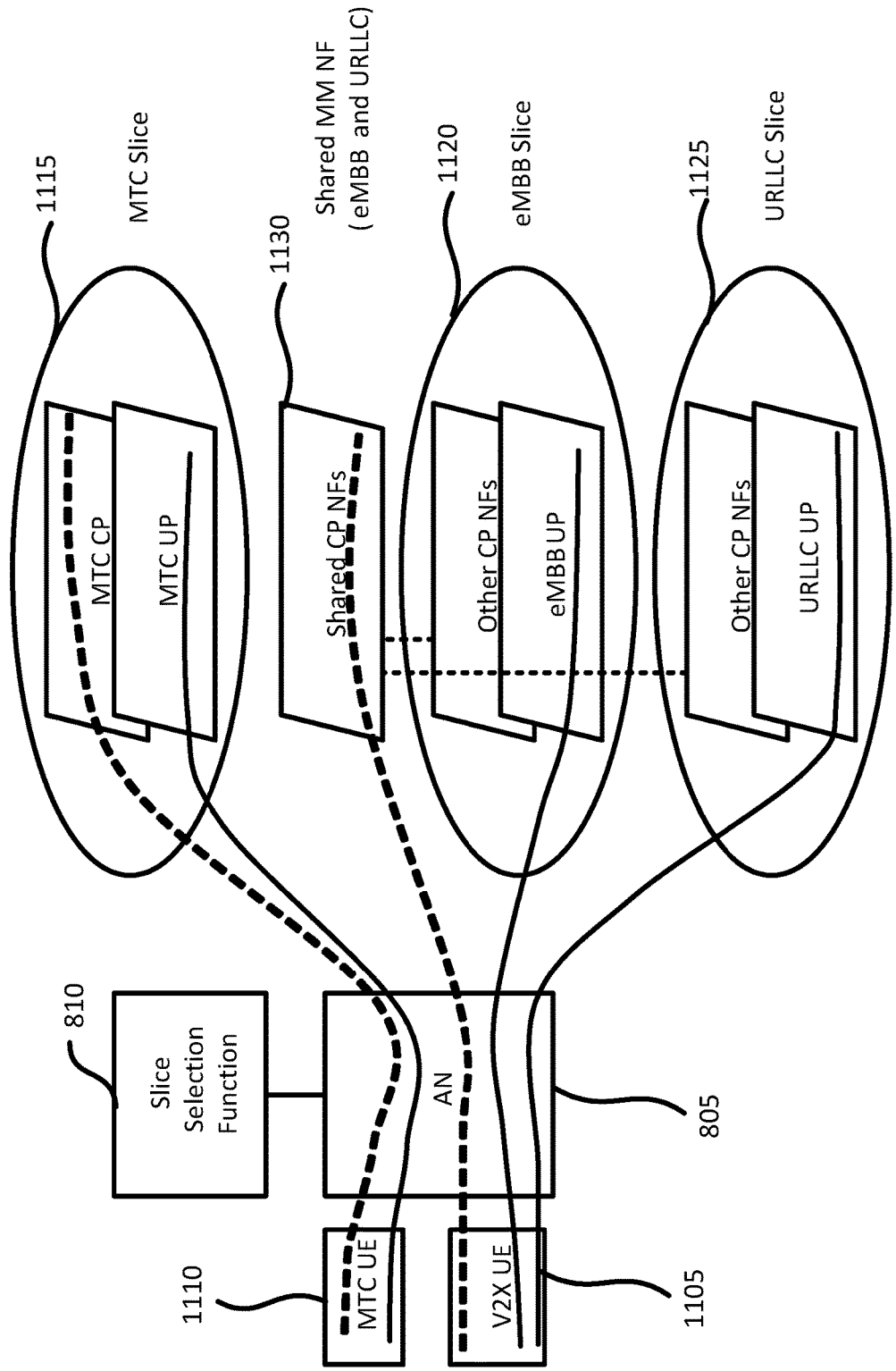
FIG. 11A illustrates an architecture for a plurality of UE's accessing a plurality of network slices according to an embodiment.
FIG. 11B illustrates an architecture for a plurality of UE's accessing a plurality of network slices according to an embodiment.
Figure 11:
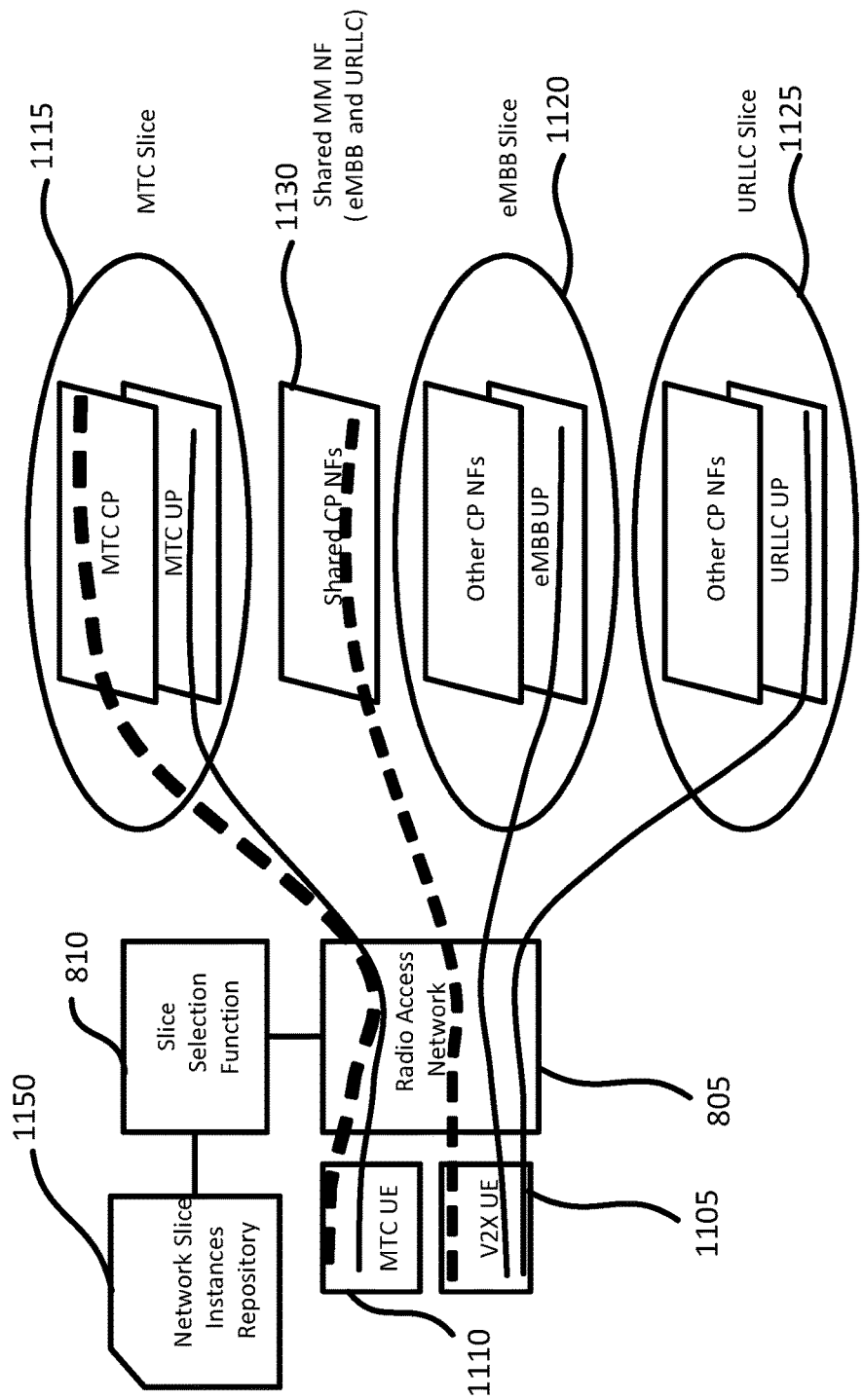

FIG. 11 A is an illustration of a hybrid scenario where the MTC UE 1110 has connected to the MTC slice 1115 with a single associated MTC CP. The V2X UE 1105 has connected to two network slices, the eMBB slice 1120 and the URLLC slice 1125. In this embodiment, the eMBB slice 1120 and the URLLC slice 1125 share a common MM NF 1130, and also each have local discrete CP NF's, an eMBB CP NFs and an URLLC CP NFs respectively. In the following description it should be understood that the shared CP NFs 1130 may form a subnetwork, and the other CP NFs in each network slice 1120, 1125 may form their own isolated subnetworks in that network slice 1120, 1125. The CP combination of the shared subnetwork and an isolated subnetwork may then be, when taken together, a control plane associated with the UP in the network slice 1120, 1125. In the following description, these subnetworks holding the shared CP NFs and other CP NFs may individually be referred to as control planes for the sake of simplicity, although it is recognized that they may be better described as control plane fragments or simply subnetworks.

When a UE first sends an Attach Request to the AN, the AN forwards the request to the Slice Selection Function (SSF). Based on the UE's subscription information, UE usage type and service type, the slice selection function associates the UE to one or more slices.

If the UE can only attach to one network slice, then the SSF selects a CP NF for setting up a CP interface. The CP NF can select the UP NF and setup the UP interface. Otherwise, if the UE is capable of attaching to multiple network slices then there are two options. In option 1, the SSF can select multiple slices for the UE based on the UE's subscription information. In option 2, only a default or UE-specified slice is selected. The UP connection may optionally be setup during the attachment procedure. The UE can specify a specific network slice using a service type ID in the UE's Attach Request. In this case, the UE can attach to the second slice after the attachment procedure by sending a new service/session request.

FIG. 11 B illustrates an embodiment of the scenario illustrated in FIG. 11 A, further including a Network Slice Instances Repository (NSIR) 1150 connected to the SSF 810. The NSIR 1150 providing a database of available network slice instances for query and retrieval by the SSF 810.

In an LTE network, each eNodeB is connected to a pool of MMEs. When a UE attaches to the network, the eNodeB connects the UE to an MME selected from the pool. Because there is only one type of MME, each of the MMEs in the pool is able to provide the same services to the UE. The MME is selected using a Non Access Stratum (NAS) Node Selection Function (NSF), referred to a "NNSF". The NNSF typically resides within the eNodeB. Because the AN discussed herein may connect to a Slice Selection Function (SSF). The SSF selects the slice that the UE will attach to and provides an indication of the selected slice to the AN. There may still be a need for an NNSF, and the functionality of the NNSF can reside within the AN or within the SSF. If the NNSF resides within the SSF, the SSF may provide both an indication of the slice selection and the indication of the Control Plane NFs (e.g. the MM NF). Where the CP and UP reside within a slice, this may be as simple as indicating the slice ID. Where the CP is formed from CP fragments (subnetworks housing CP NFs), there may be a need to both indicate the slice ID and the particular CP NFs that are to be used.

Figure 12:
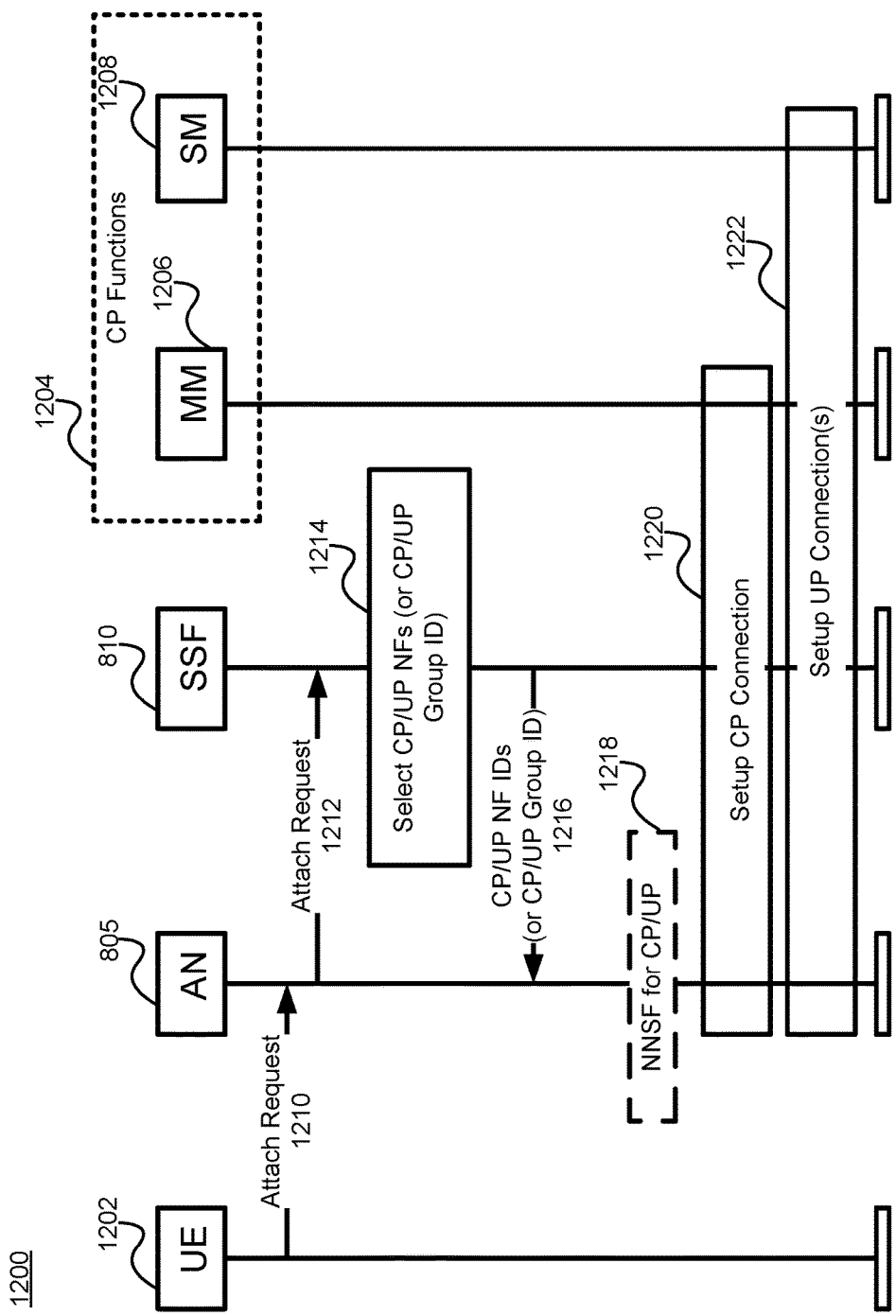
FIG. 12 illustrates a signaling diagram for CP NF and UP NF attachment according to an embodiment.

An embodiment of the UE attach procedure 1200 is illustrated in a signaling diagram shown in FIG. 12. The steps are as follows:

UE 1202 sends an Attach Request 1210 to an Access Node (AN) 805 which is alternately referred to as an Access Point.

The attach request may include information about the UE 1202 and the services that are being requested. The AN 805 has to determine which network slice the UE 1202 should be associated with. To do this, the AN 805 sends a slice selection request to the SSF 810. This may take the form of forwarding the received Attach Request to the SSF 810 as shown in 1212.

The SSF 810 undertakes a slice selection process 1214 in accordance with information received from the AN 805 in the Attach Request 1212. This information may include, or may be supplemented with information related to the UE's subscription information. The Slice selection process 1214 selects the slice to which the UE will be attached. An indication of the selected slice is transmitted to the AN 805 in 1216. If the SSF 810 provides NNSF functionality, the slice selection process 1214 can also select the control plane and user plane network functions associated with the selected slice. An indication of the selected CP and UP network functions is sent to the AN 805 as shown in message 1216. If the NNSF is not included in the SSF 810, the AN 805 can perform the NNSF based selection of the CP and UP functions in optional step 1218 in accordance with the received identification of the selected slice.

The CP NFs 1204 can include the MM 1206 and the SM 1208. The CP NFs 1204 handle the CP packets to/from the UE (e.g. the Attach Request). The CP NFs 1204 can, in some embodiments, select the UP NFs, if not all (or none) of the UP NFs were previously selected. One UP NF is a UE mobility anchor. The UE 1202 may have a different mobility anchor for different types of services (e.g. If the services are provided on different network slices).

Upon receiving the CP (and optionally the UP) NF IDs, the AN 805 can begin setting up the connections. The CP connection setup 1220 can be performed with a specified MM 1206, and the UP connection setup 1222 can be performed with a specified SM 1208.

Instead of selecting a particular CP or UP NF, the SSF 810 can, in some embodiments, select a pool of CP NFs (e.g. MM NFs) and a pool of UP NFs (e.g. mobility anchors) corresponding to a specific slice. The SSF 810 can then send the group identifier to the AN 805 in message 1216. The AN 805 can select the CP NFs from the CP pool during connection setup 1220. The selected CP NF can select the UP NF(s) from the pool of UP NFs (i.e. The AN can perform a similar function as the NNSF) during the setup of the UP connections 1222.

In both methods, multiple UP interfaces may be established during the attach procedure depending on the UE's subscription information and the information included in the UE's Attach Request (e.g. UE usage type or service type or a Network Slice ID).

In one embodiment only the CP connection procedure is setup during the attach procedure. The UP connection procedure may then be performed during the new service/session request procedure. During the Setup CP connection procedure, the CP NF performs the authentication and authorization procedure by checking the UE's subscription information with a NF such as the HSS to determine if the UE is authorized to use the requested service. In an aspect, the Setup CP connection procedure may further include the authentication and authorization procedure for a default service, or a UE specified service.

In an aspect a method is provided. A UE may send an Attach Request to the AN, requesting attachment to a network slice, or to a service supported by a network slice. The AN forwards the attach request to a Slice Selection Function (SSF). The SSF may evaluate device criteria of the UE, including for instance: UE usage type, requested service type, account information, security policies, etc., and assign the requesting UE to one or more network slices supported by the AN.

In the simplest case the UE is only capable of connecting to (or only permitted to connect to) a single slice offered by the AN. The SSF may then select a CP, and a UP associated with the slice. The SSF then returns a CP identifier corresponding to the selected CP, and a UP identifier corresponding to the selected UP to the AN. The AN may then use the returned CP identifier and UP identifier to setup a CP connection and a UP connection for the requesting UE. A CP NF can be selected to handle the CP packets to and from the UE. A UP NF can be selected by the CP NF to act as the mobility anchor for the UE for that network slice.

In an aspect, the SSF may return a pool of CP identifiers and corresponding UP identifiers to the AN. The AN can select one CP identifier and UP identifier from the pool for connection. Multiple UP connections may be established during the attach procedure, depending upon the attach request, the UE identifier, the UE subscription information, UE usage type, service type, network slice ID, or other relevant information.

Figure 13:
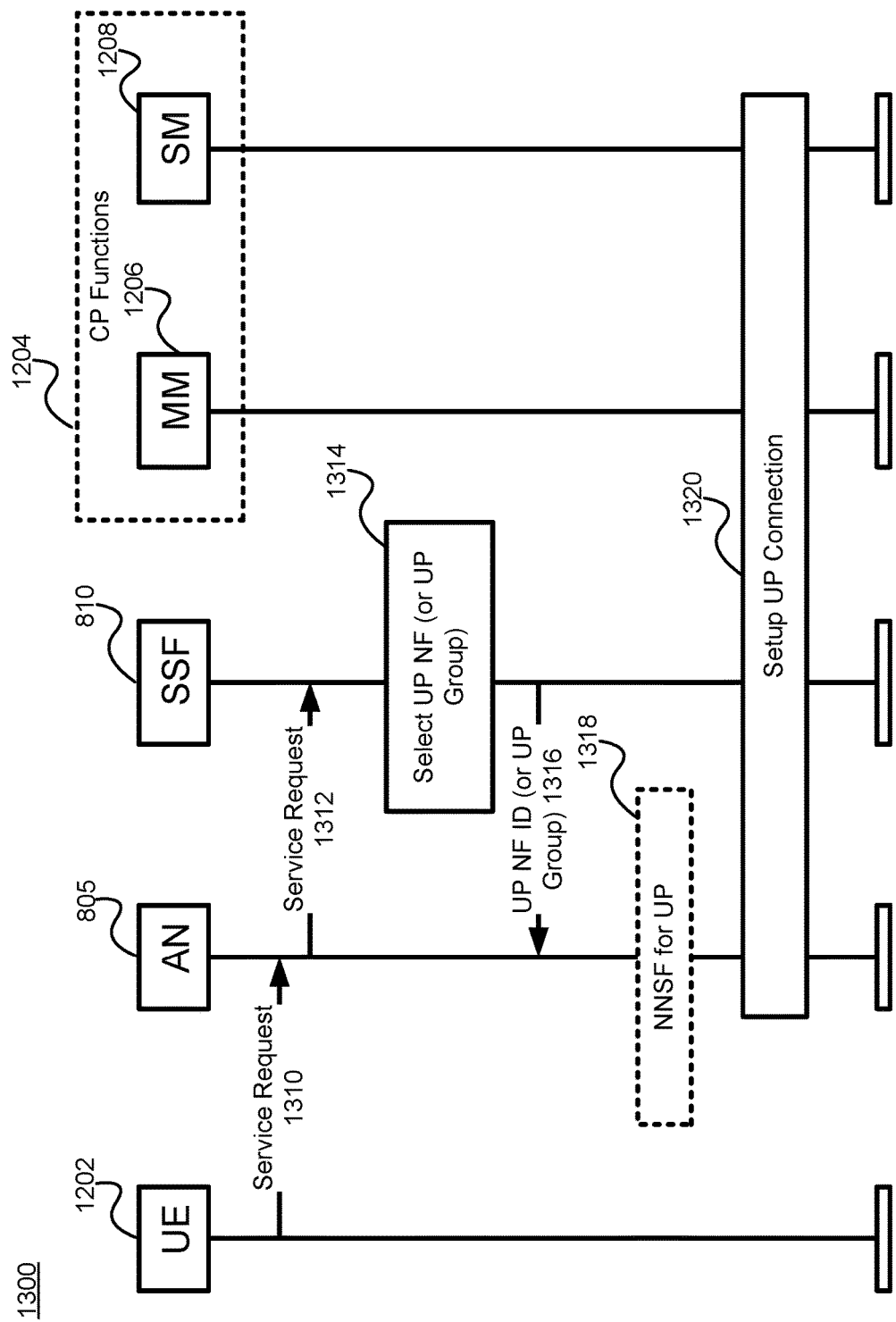
FIG. 13 illustrates a signaling diagram for UP NF attachment according to an embodiment.

If no UP connection, or only a default (or UE specified) UP connection, is setup for the UE during the attach procedure, and if the UE later requests a service that is provided by another network slice, then another UP connection can be setup during the new service/session request procedure. One such procedure 1300 is illustrated in FIG. 13. The steps are as follows:

UE 1202 sends a new Service Request 1310 to AN 805.

The AN 805 may forward the request 1312 to the SSF 810, or it may transmit a request, based on the received Service Request, to the SSF 810.

The SSF 810 selects the network slice in slice selection process 1314. The CP for the slice can select the UP NF for the UP packets (i.e. Performs a function similar to the NAS Node Selection Function).

The SSF 810 then transmits 1316 the selected UP NFs to the AN 805.

Alternatively, the SSF 810 can select a pool of mobility anchor NFs corresponding to a specific slice and the AN 805 can select the UP NF(s) from the pool of UP NFs (i.e. The AN can perform a similar function to the NNSF).

If the NNSF functions are not performed by the SSF 810, the AN 805 can optionally perform the NNSF functions for the UP in 1318.

The Service Request is then forwarded to the selected CP NF 1204.

During the Setup UP Connection procedure 1320, the CP NF (e.g. SM 1208) performs the authentication and authorization procedure (by checking the UE's subscription information with a NF such as the HSS) to determine if the UE 1202 is authorized to use the requested service.

The MM NF 1206 can be either in a shared sub-network or in an isolated sub-network. The MM 1206 and SM 1208 NFs can either be in the same sub-network (shared or isolated) or the MM NF 1206 can be in a shared sub-network, while the SM NF 1208 is in the slice specific isolated sub-network. Other CP functions such as the HSS and authentication/authorization NFs can be in the same sub-network as the MM NF 1206 or they can be in the slice specific sub-network.

In one embodiment, the AN 805 may have a separate interface to the MM NF 1206 and to the SM NF 1208. The Attach Request and setup of the CP connection can be handled by the MM NF 1206, while the Service Request and setup of the UP connection can be handled by the SM NF 1208.

In another embodiment, in order to perform the network slice association procedure, the eNB (or other network access point/access node) can broadcast the MME type and network slice type combinations that are available. When a UE sends an Attach Request, the UE can include the selected combination in the Attach Request. The MME type and network slice type combination can be specified by a Network Slice ID. Alternatively, the combination can be specified by specifying both the MME type and the network slice type. Those skilled in the art will appreciate that this example of a UE attach procedure is not intended to be limiting. Furthermore, if the service request 1310 or attach request 1210 include an indication of an intended slice, there is no requirement for the AN 805 and SSF 810 to necessarily attach the UE 1202 to the specified slice. The slice indicated by the UE 1202 can be one of the factors considered by the SSF 810 in some embodiments.

It will be understood that a Service Request, such as service request 1310, can be understood as a request for a new session to be created within which a service can be performed.

Figure 14:
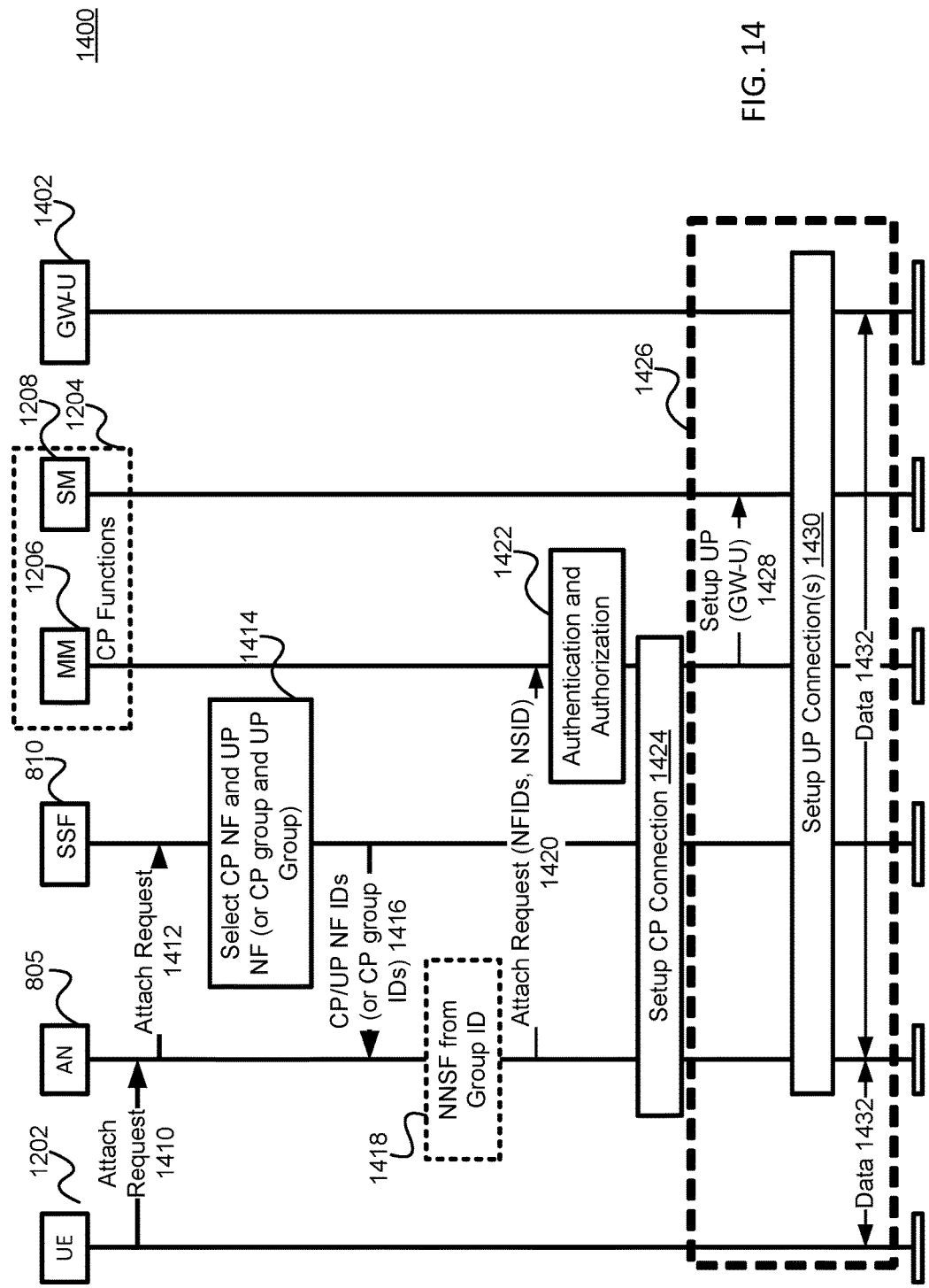
FIG. 14 illustrates a signaling diagram for CP NF and UP NF attachment according to an embodiment.

Referring to FIG. 14, the signaling diagram 1200 of FIG. 12 is extended. In the signal flow 1400 of FIG. 14, the same nodes as were discussed with respect to FIG. 12 are illustrated, with the addition of a User-Plane Gateway (GW-U) 1402. As shown, Attach requests 1410 and 1412 are transmitted so that the SSF 810 receives the indication that the UE 1202 needs to be attached to a slice. Slice Selection process 1414 is performed, and the slice for the UE to attach to is selected, and an indication of the selection is transmitted 1416 to AN 805. As discussed with respect to FIG. 12, the CP/UP NFs can also be selected by the SSF 810 and included in indication 1416. If the NNSF procedure is not performed at SSF 810, the CP/UP functions can be selected based on the contents of message 1416. The AN 805 can then send an attach request 1420 to the MM 1206 indicated in either message 1416 or determined as a result of process 1418. Authentication and authorization 1422 may then be completed by the MM CP NF 1206. After authentication and authorization, the AN 805 and the MM 1206 can setup the CP connection 1424. Upon establishing the CP connection, the MM CP NF 1206 and the SM CP NF 1208 can setup the UP 1428, which may include selecting the GW-U 1402. The UP connection(s) between the AN 805 and the GW-U 1402 are setup 1430, and at this point UE 1202 may exchange data 1432 with the GW-U 1402 through the AN 805. As discussed above, the selection of functions corresponding to the role of an NNSF may be performed in one or both of the SSF 810 and AN 805. In some embodiments, the MM 1206 may perform the NNSF function to select an SM NF 1208.

Figure 15:
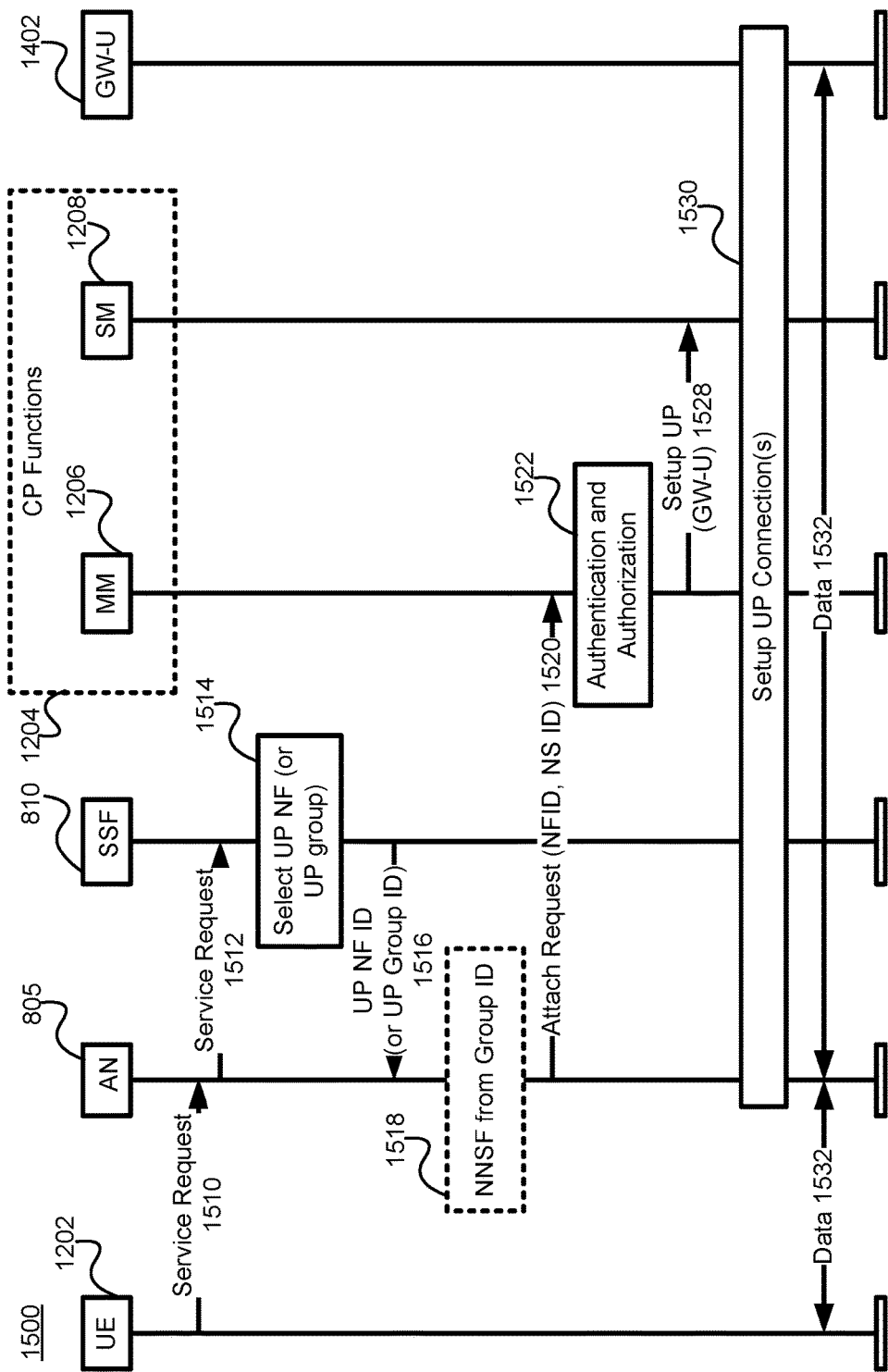
FIG. 15 illustrates a signaling diagram for UP NF attachment according to an embodiment.

Referring to FIG. 15, the signaling diagram 1300 of FIG. 13 is extended. In the signal flow 1500 of FIG. 15, the same nodes as were discussed with respect of FIG. 13 are illustrated, with the addition of a GW-U 1402. As shown, Service Requests 1510 and 1512 are transmitted so that the SSF 810 receives the indication that the UE 1202 would like to access a service associated with a slice. The slice selection process 1514 is performed, and the slice for the UE to attach to is selected, and an indication of the selected slice is transmitted 1516 to AN 805. As discussed with respect to FIG. 13, the UP NFs can also be selected by the SSF 810 and included in indication 1516. If the NNSF procedure is not performed at SSF 810, the UP functions can be selected based on the contents of message 1516. The AN 805 can then send attach request 1520 (which can specify the network Function ID (NFID) and the Network Slice ID (NSID)) to the MM 1206. Authentication and authorization 1522 may then be completed by the MM CP NF 1206 before setting up the UP connection 1528 with the SM CP NF 1208. The setup instruction 1528 may specify a particular GW-U if this function is selected by the MM 1206. If no GW-U is specified, the SM 1208 can select the GW-U. The CF NFs 1204 can then setup the connections between the AN 805 and the GW-U 1402 as illustrated in 1530. After completing the UP connection(s), the UE 1202 may exchange data 1532 with the GW-U 1402 through the AN 805. As discussed above, the selection of functions corresponding to the role of an NNSF may be performed in one or both of the SSF 810 and AN 805. The MM NF 1206 may also perform an NNSF like function to select an appropriate SM NF 1208.

Figure 16:
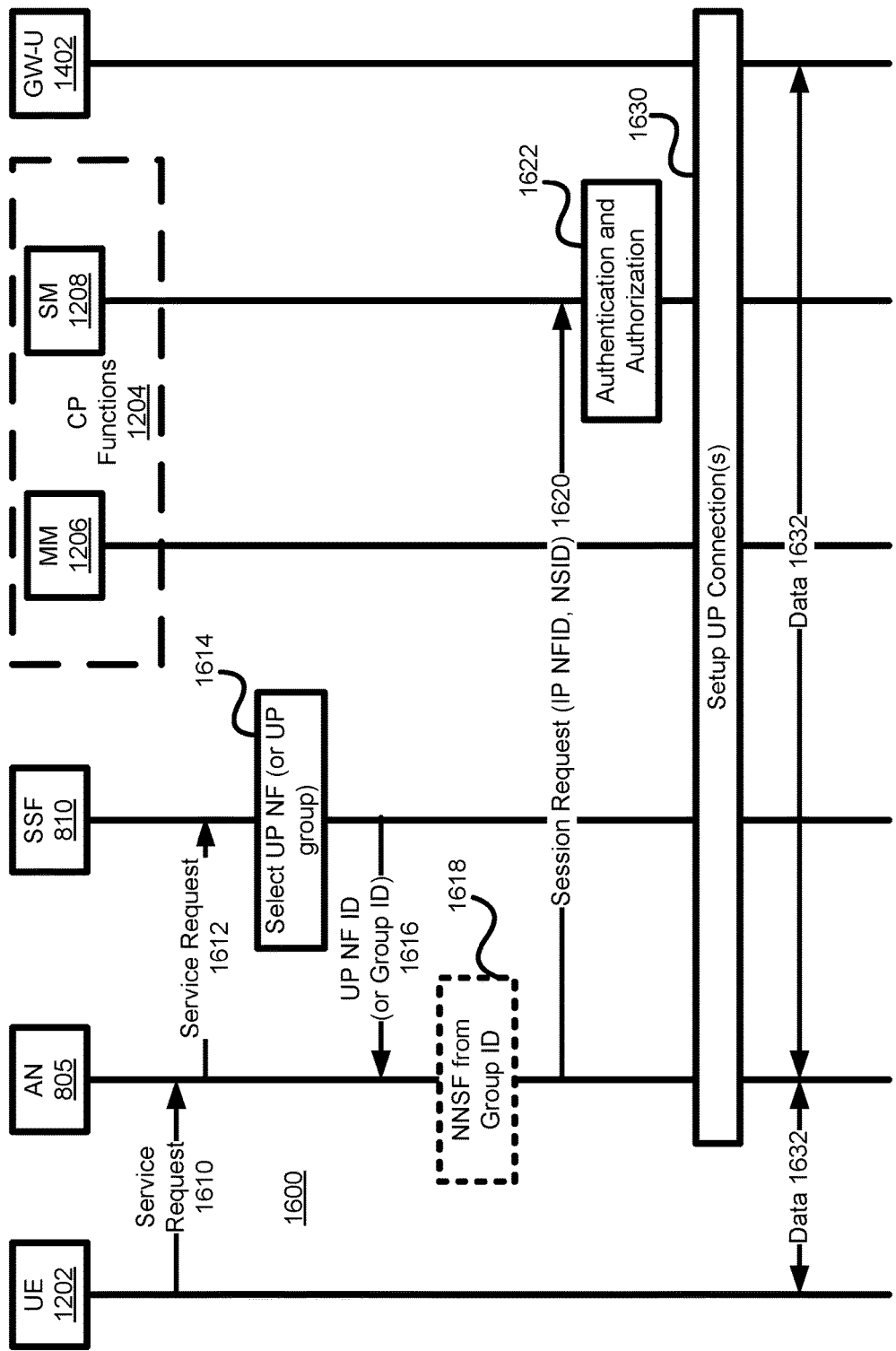
FIG. 16 illustrates a signaling diagram for UP NF attachment according to an embodiment.

Referring to FIG. 16, signaling diagram 1600 is an embodiment the signaling diagram 1300 of FIG. 13 which has been extended to illustrate a session request from the AN 805 directly to the SM CP NF 1208, to establish the UP connection(s) between the AN 805 and the GW-U 1402 using the existing CP connection. As before, Service requests 1610 and 1612 are transmitted so that the SSF 810 receives the indication that the UE 1202 would like to access a service associated with a slice. The slice selection process 1614 is performed, and the slice for the UE to attach to is selected, and an indication of the selected slice is transmitted 1616 to AN 805. As discussed with respect to FIG. 13, the UP NFs can also be selected by the SSF 810 and included in indication 1616. If the NNSF procedure is not performed at SSF 810, the UP functions can be selected based on the contents of message 1616 at AN 805. The AN 805 can then send attach request 1620 (which can specify the network Function ID (NFID) and the Network Slice ID (NSID)) to the SM CP NF 1622, which may then perform the authentication and authorization 1622. Upon authentication and authorization, SM 1208 can setup the UP connection(s) between the AN 805 and the GW-U 1402. This allows a data session 1632 to be created that allows the UE 1202 to communicate with GW-U 1402 through An 805. As discussed above, the selection of functions corresponding to the role of an NNSF may be performed in one or both of the SSF 810 and AN 805.

Figure 17:
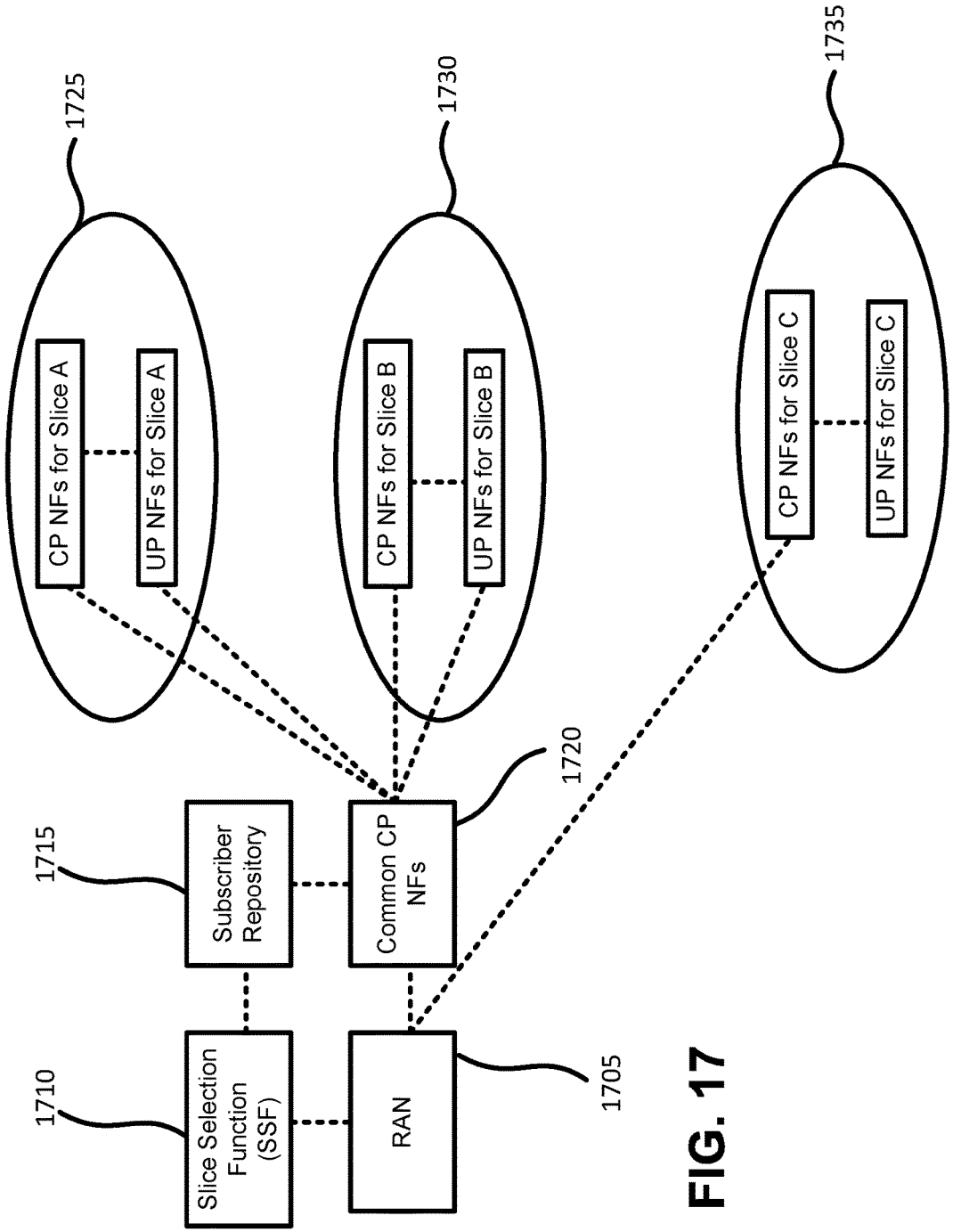
FIG. 17 is a block diagram illustrating an architecture in accordance with an embodiment.

FIG. 17 is a block diagram illustrating control plane interfaces for network slicing with both common and slice specific functions. In this embodiment, slice routing and selection is provided to link the radio access bearer(s) of a UE with an appropriate core network instance. This embodiment provides slicing that is transparent to the UE.

As shown in FIG. 17, control traffic flows from the Common CP NFs 1720 to both the CP and the UP NFs for slice A 1725 and slice B 1730, while control traffic for slice C 1735 flows from the RAN 1705 to the CP NFs in slice C 1735. In one embodiment, for network slices that have a common CP NF, e.g. slice A 1725 and slice B 1730, an additional direct interface between the RAN 1705 and the slice specific CP NF's may be provided (not shown).

Each network slice instance (NSI) has a network slice instance ID (NSI-ID). For slices with common CP NFs the NSI-ID may be a combination of a common CP NF ID and a slice specific UP NF ID identifying the UP NFs for that slice. The slice selection function (SSF) 1710 can be provided in the RAN 1705, similar to existing networks in which an NAS Node Selection Function resides in the RAN 1705. In another embodiment, a Core Network provided function may perform the functions of the SSF 1710. The SSF 1710 selects an appropriate slice for the UE in accordance with information provided by the UE (and optionally by the CN). In the embodiment illustrated in FIG. 17, the SSF 1710 is in communication with a subscriber repository 1715 which also provides a direct interface to the common CP NFs 1720. In this embodiment, the slice specific CP NFs interface with the common CP NFs, but do not have a direct interface with the subscriber repository 1715. In an aspect, the slice specific CP NFs have a direct interface to the subscriber repository 1715.

As instances of a PLMN share radio access functions, there may be a need to separate access barring and load/overload control on a per slice basis. This may be accomplished using separated access barring and load/overload control as it is currently known in the art, so long as it has been provided by the PLMN operator for network sharing. With such a solution, there may be CN resources that cannot be fully separated (e.g. transport network resources). RAN internal slicing or management of shared RAN resources can be addressed in the number of different ways without departing from the techniques disclosed herein.

The SSF can handle the UE's initial Attach Request. This may be performed by selecting an appropriate slice for the UE based on (or in accordance with) information including the UE's subscription information, UE usage type and service type. During the attach procedure the SSF can associate the UE to a default slice and/or a UE specified slice type. The UE may subsequently request other services that result in attachment to other slices. If the UE is re-attaching to the network after attaching to a specific network slice, the UE may provide the NSI-ID in its Attach Request. Upon receipt of an Attach Request including an NSI-ID, the AN can send the request directly to a CP NF corresponding to the specified slice.

After selecting the NS, the SSF may perform the NNSF to select the CP NFs corresponding to the selected slice. Alternatively, the SSF may forward the NSI-ID to the AN and the AN can perform the NNSF. In either case, the UE may be authenticated by the CP NFs in response to receipt by the SSF of the service request.

A UP connection (or connections) for the UE can be established by the selected CP NF. The UP connection can be established during the attach procedure or they can be setup after the UE sends a New Service Request. If it is established during the attach procedure, then a default or UE specified UP connection is setup.

After the attach procedure, a UE can be associated with multiple slices if the UE sends multiple new service requests for services that are provided by different slices. The attach procedure is the same for the case where the UE can attach to one slice or multiple slices.

The SSF is involved in the following procedures: an Attach procedure, a new service request; overload control; and slice reselection.

In the attach procedure: the SSF selects a slice for the UE during the initial attach procedure based on the UE's subscription information, UE usage type and service type (if provided); the SSF performs a UE identity check before a slice is selected (this function may be common to all slices); the SSF may associate the UE with one default slice and/or a UE specified slice during the attach procedure; the SSF may perform the NNSF and send the selected CP NFIDs to the AN (Alternately, it may select the NS and the AN performs the NNSF).

In the New Service Request: The SSF may select additional slices for a UE after the initial attach request; and the new service request may be forwarded to the SSF by the common CP MM selected from the initial attach procedure.

The Overload Control: receives congestion control information from CN functions; determines the relevant slices to apply congestion control based on the congestion control policy; and checks the congestion information during the slice selection procedure.

In slice reselection, the SSF receives an attach request and re-selects another slice for one of the following events: UE mobility and Slice instantiation, adaptation or termination.

Figure 18:
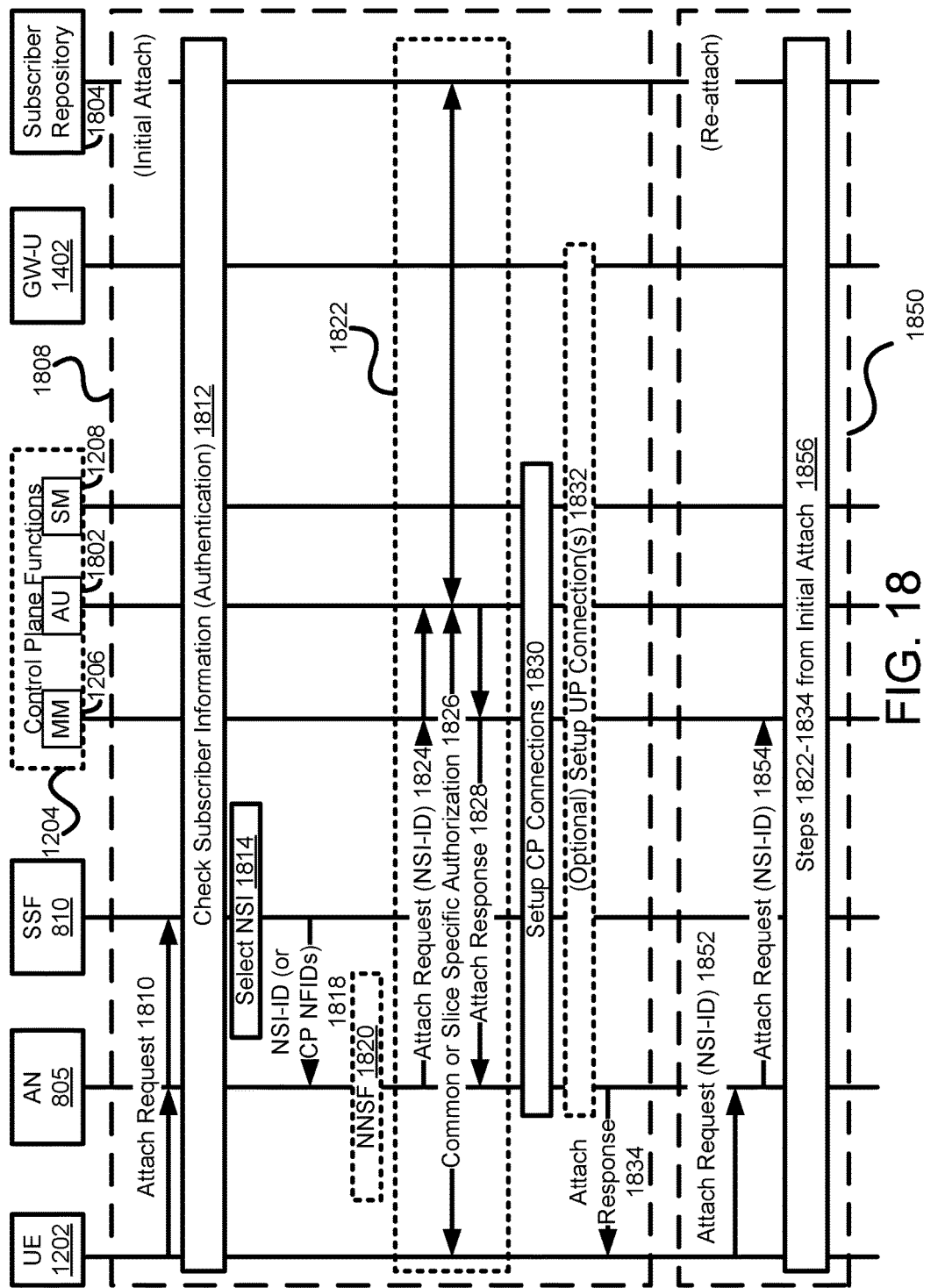
FIG. 18 is a call flow diagram illustrating a method in accordance with an embodiment.

Referring to FIG. 18, a signaling diagram 1800 is presented illustrating the UE attach procedure.

In the illustrated example, the MM NF 1206 handles the Attach Request. The MM NF 1206 can be a common function if there is a shared CP and can be slice specific if the CP is not shared. The SM 1208 and AU 1802 NFs may be either common or slice specific. Slice specific authentication and authorization may be required when slices require different levels of security. The attach procedure can be applied to:

1. The MM, AU and SM are all slice specific (e.g. Group A slice configuration).
2. The MM is common. The AU and SM are slice specific.
3. The MM and AU are common. The SM is slice specific.

It should be understood that because slices are configured with different levels of security, slice resource isolation can be used to ensure that the slices with a higher security level are not compromised by UEs attaching to a lower security slice.

In the call flow illustrated in FIG. 18, the initial attachment process 1808 starts with an attach request 1810 that is transmitted from the UE 1202 to the SSF 810 through AN 810. The SSF determines which slice(s) the UE is authorized to use by accessing the Subscriber Repository and performs an identity check as illustrated by the subscriber identity check (authentication) 1812. The SSF 810 selects the appropriate slice based on the information received from the UE in the Attach Request and profile information in the Subscriber Repository as indicated by the Network Slice Instance (NSI) selection 1814. The SSF 810 selects the NSI-ID or the CP NF IDs and transmits an indication of the selection to the AN 805 as shown in message 1818. If the SSF 810 selects the CP NFs 1204, it sends the CP NF IDs to the AN 810 (for example in message 1818). If only the slice is selected, then the AN 805 can undertake the NNSF process in 1820 to select CP NFs from a pool of CP NFs based on the NSI ID. In 1822 a common or Slice Specific Authorization procedure can be carried out. In one embodiment this includes:

The AN 805 transmitting an Attach Request 1824 to the MM NF 1206. The MM 1206 selects the AU NF 1805 to handle the authorization and then transmits the authorization/authentication request. The Authentication Network Function (AU NF 1802) can be either common or slice specific.

The AU 1802 performs the authentication/authorization procedure 1826 which may involve checking the UE identity with the Subscriber Repository 1804.

The AU 1802 sends an Attach Response 1828 to the MM 1206 which can be then transmitted AN 805.

The MM NF 1206 can then setup the CP connection 1830. Optionally, the UP connections can be established in 1832. The AN 805 can then forward the Attach Response 1834 to the UE 1202. The Attach response 1834 can include the NSI-ID. The NSI-ID can be used when the UE 1202 is required to re-attach to the network.

A re-attach procedure 1850 is now described. The UE 1202 has been previously detached from the network. The UE 1202 transmits an Attach Request 1852 which includes the NDI-ID which was previously provided to the UE 1202. The AN 805 forwards the attach request 1854 (re-attach request) to the MM NF 1206 which is appropriate for the indicated NSI-ID. The MM 1206 can then (as indicated in 1856) repeat the processes and messages 1822-1834 discussed above.

Figure 19:
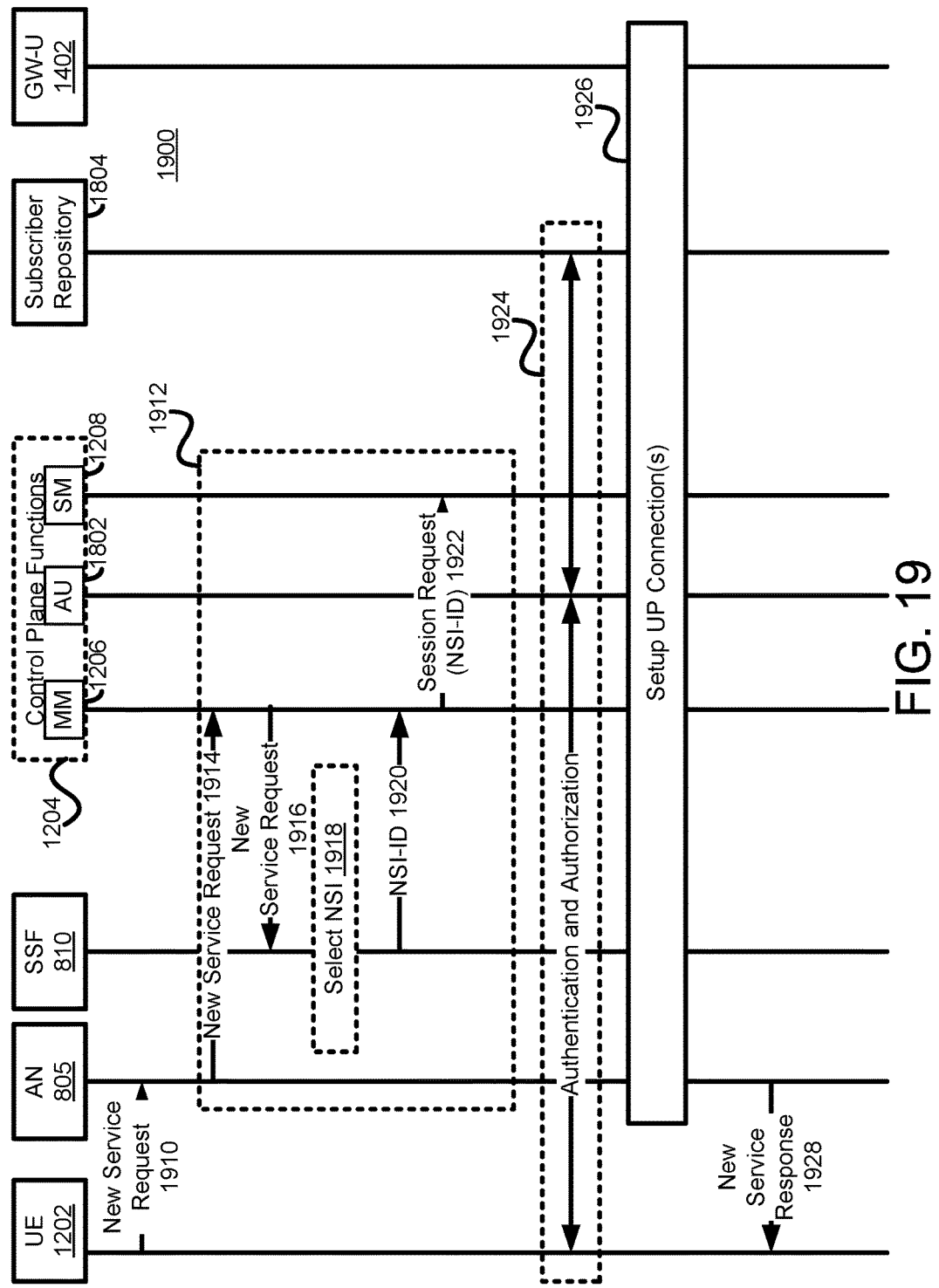
FIG. 19 is a call flow diagram illustrating a method in accordance with an embodiment.

If no UP connection is setup or if only a default UP connection is setup for the UE, and the UE requests a service that is provided by another slice, then another UP connection for the UE is setup during the New Service Request procedure. In the example of FIG. 19, the UE has a connection to common MM NF. The SM NF is assumed to be slice specific. The AU NF can be either common or slice specific.

In some embodiments, such as the call flow 1900 illustrated in FIG. 19, it is the MM that makes the slice selection request. In the illustrated embodiment, the SSF is a function outside of the control plane functions 1204, and may be instantiated at a location close to the AN. In other embodiments, the SSF can be a part of a common control plane, or even may be integrated within an existing control plane function (e.g. the MM). As illustrated in FIG. 19, the UE 1202 sends a service request 1910 to the AN 805. A slice selection procedure 1912 is undertaken. The AN 805 forwards a new service request 1914, on behalf of the UE 1202, to an MM 1206. The MM 1206 issues a service request 1916 to the SSF 810, which performs the network slice instance selection process 1918, and sends an identifier of the selected NSI 1920 to the MM 1206. If the UE 1202 has already been admitted, and attached to a slice, the NSI selection 1918 may be omitted. In some embodiments, if a UE 1202 has been attached to a slice, the SSF 810 can determine whether the requested service can be provided within the slice that the UE 1202 has already been admitted to. If the service cannot be provided in the already attached slice, a new slice can be selected. The MM 1206 sends a Session Request 1922 to the corresponding SM 1208.

The MM 1206, or SM 1208, can request authentication or authorization using known techniques. AA 1802 can perform the authentication and authorization process 1924 involving both UE 1202 and subscriber repository 18040 (such as an HSS). If the AU NF 1802 is slice specific, the it can perform a slice specific authentication and authorization procedure. If the AU NF 1802 is a common function for all slices, then the authentication procedure may be avoided if the UE 1202 has already been authenticated in a process for a previous slice associated with the common MM 1206 and AU 1802 NFs.

Upon confirmation of the authentication of the UE 1202, the SM 1208 can perform the session management procedure 1926 to setup the UP connection. The AN 805 can then send a New Service Response 1928 to the UE 1202.

In different embodiments, different entities can determine how to compose the slices (i.e. using common or slice specific SM and AU NFs).

Figure 20:
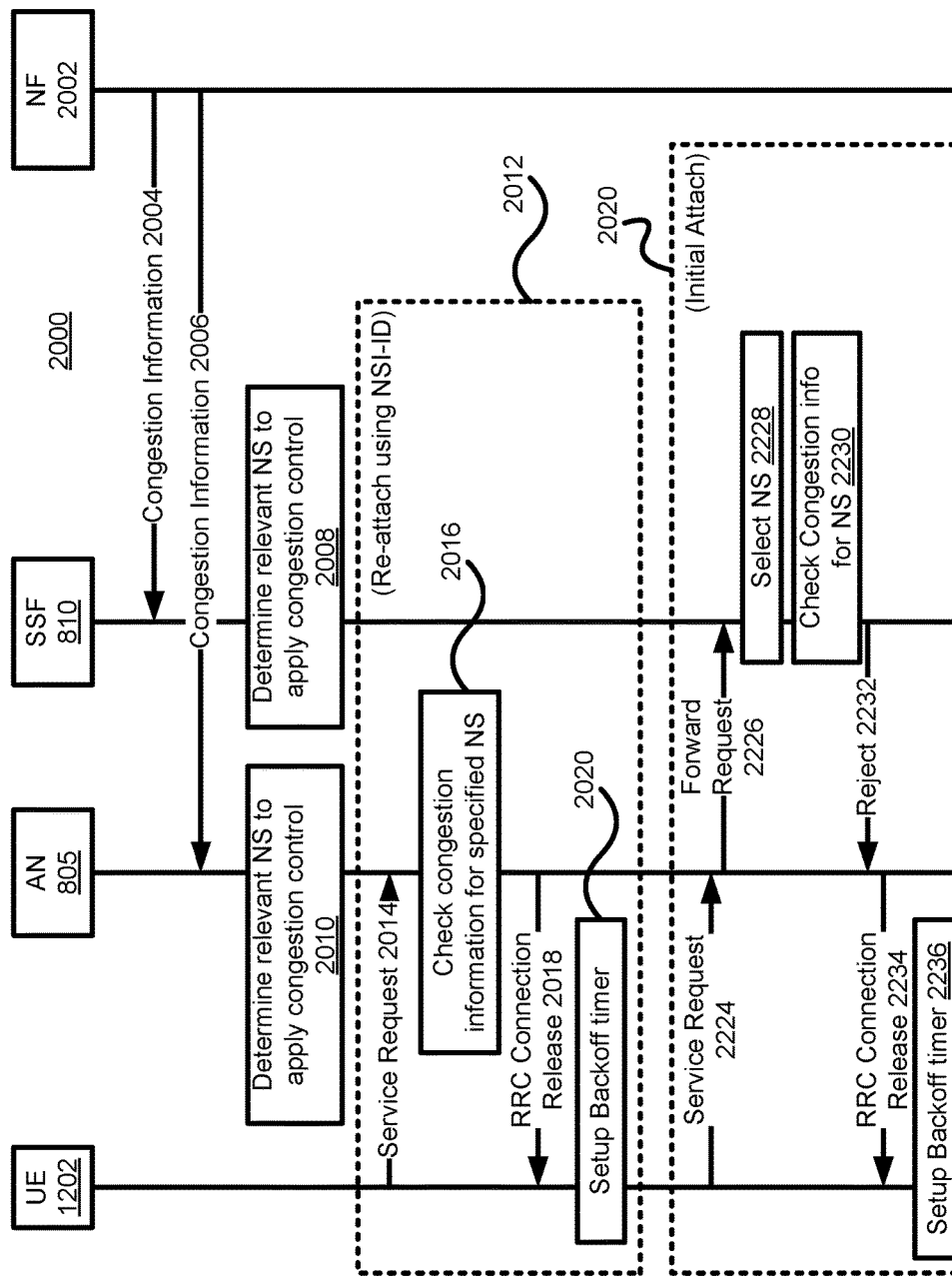
FIG. 20 is a call flow diagram illustrating a method in accordance with an embodiment.

FIG. 20 illustrates an embodiment of an overload procedure 2000. In step 1, a congested NF 2002 sends Congestion Information 2004 to the SSF 810. The Congestion Information 2004 may take the form of an alert, and can contain the supported CN slice type and congestion level. The congestion level indicates the current overload status of the CN serving node. The congestion information 2006 is sent to the ANs 805. In some embodiments, the SSF 810 can forward the received congestion information 2004 to the AN 805 to replace message 2006. The ANs 805 and the SSF 810 determine the relevant network slices associated with the received congestion information and apply the congestion policy 2008 and 2010 to the relevant network slices. One skilled in the art will appreciate that instead of two different nodes undertaking the determining processes, in some embodiments, the SSF 810, upon receipt of congestion information 2004 can undertake process 2008, and then forward both the congestion information and congestion control instructions to AN 805.

A re-attach procedure 2012 using a NSI-ID can be carried out. The UE 1202 sends a service request 2014 to the AN 805 for a specified NS. The UE 1202 includes the slice assistance information (e.g. NSI-ID) in the request message to assist in the slice selection process. The AN 805 determines which slice the UE 1202 is requesting to be associated with based on the slice assistance information. The AN 805 checks the congestion information for the indicated slice 2016, and upon determining that the slice is too congested to serve the UE 1202, the AN 805 sends an RRC Connection Release command 2018 to the UE 1202. This may be done in any of a number of different ways, including using a procedure such as the one defined in TS 36.331. The UE can then set a back-off timer 2020. This allows the AN 805 to prevent further overloading of the congested NF 2002, and lets the UE 1202 determine when it should attempt a re-attach.

An initial attach procedure 2020 can also be undertaken. The UE 1202 sends an initial Attach Request or a Service Request 2224 to the AN 805. This service request 2224 typically does not include slice assistance information. The AN 805 forwards the request 2226 (possibly with modifications as discussed above) to the SSF 810. The SSF 810 undertakes a slice selection process 2228, and can then check for congestion in the selected slice 2230. If the selected slice is subject to congestion control, the SSF 810 sends a rejection instruction 2232 to the AN 805. This reject message 2232 may still include an NSI ID. AN 805 can then transmit an RRC Connection Release 2234 to the UE 1202. The UE can then set a back-off timer 2236.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing and communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system, or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more processors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method, for execution by an access node (AN) in a mobile network, for attaching a User Equipment (UE) to a network slice, the method comprising:
   receiving a UE attach request from the UE;
   transmitting towards a slice selection function (SSF), an attach request generated in accordance with the UE attach request received from the UE;
   receiving, from the slice selection function, a slice identifier associated with a selected network slice;
   initiating a connection setup including a control plane connection, in accordance with the received slice identifier, between the UE and a control plane network function associated with the selected network slice.

2. The method of claim 1 wherein the received UE attach request is a request for a connection to a network.

3. The method of claim 1 wherein the received UE attach request is a request for a connection for a new service.

4. The method of claim 1 wherein transmitting the attach request generated in accordance with the received UE attach request includes forwarding the attach request towards the SSF.

5. The method of claim 1 wherein the step of transmitting the generated attach request towards the SSF includes transmitting the generated attach request to a Mobility Management (MM) function.

6. The method of claim 1 wherein receiving the slice identifier includes receiving an identifier associated with at least one of:
   the control plane network function; and
   a user plane network function.

7. The method of claim 6 wherein the identifier associated with the control plane network function is a group identifier associated with a plurality of control plane network functions.

8. The method of claim 6 wherein the identifier associated with a user plane network function is a group identifier associated with a plurality of user plane network functions.

9. The method of claim 1 further comprising the step of selecting, in accordance with the received slice identifier, at least one of:
   the control plane network function; and
   a user plane network function.

10. The method of claim 1 wherein the control plane network function is associated with a second network slice different than the selected network slice.

11. The method of claim 1 wherein the step of initiating a connection setup includes initiating the setup of a user plane connection between the UE and a user plane network function associated with the network slice.

12. The method of claim 1 further including transmitting an attach response to the UE in accordance with completion of the connection setup.

13. The method of claim 1 further include the step of selecting, in accordance with the received slice identifier, at least one of:
   the control plane network function; and
   a user plane network function.

14. The method of claim 1, wherein the receiving further comprises the AN:
   receiving, a pool of control plane network functions including the control plane network function.

15. The method of claim 14, wherein the selecting further comprises the AN:
   selecting, in accordance with the received slice identifier, the control plane network function from the pool of control plane network functions.

16. The method of claim 1, wherein the slice identifier comprises a Network Slice Instance Identifier (NSI-ID).

17. A network access node (AN) operative to attach a connecting User Equipment (UE) to a network slice comprising:
   a network interface for communicating with other nodes connected to a network;
   a wireless access interface for communicating with the UE connecting to the network through the AN;
   a processor; and
   a non-transitory memory for storing instructions that when executed by processor, the AN operative to:

receive a UE attach request from the UE;

transmit towards a slice selection function (SSF), an attach request generated in accordance with the UE attach request received from the UE;

receive, from the slice selection function, a slice identifier associated with a selected network slice;

initiate a connection setup including a control plane connection, in accordance with the received slice identifier, between the UE and a control plane network function associated with the selected network slice.

18. The AN of claim 17, wherein the received UE attach request is a request for at least one of:
   a. a connection to a network; and,
   b. a connection for a new service.

19. The AN of claim 17 further operative to transmit the generated attach request towards the SSF by transmitting the generated attach request to a Mobility Management (MM) function to forward to the SSF.

20. The AN of claim 17, wherein receiving the slice identifier includes receiving an identifier associated with at least one of:
   the control plane network function; and
   a user plane network function.

21. The AN of claim 20, wherein the identifier may comprise a group identifier associated with at least one of:
   a plurality of control plane network functions; and
   a plurality of user plane network functions.

22. The AN of claim 17 wherein the step of initiating a connection setup further comprises:
   initiating the setup of a user plane connection, in accordance with the received slice identifier, between the UE and a user plane network function.

23. The AN of claim 17, wherein the AN is further operative to transmit an attach response to the UE in accordance with completion of the connection setup.

24. The AN of claim 17, wherein the receive further comprises the AN operative to:
   receive, a pool of control plane network functions including the control plane network function.

25. The AN of claim 24, wherein the select further comprises the AN operative to:
   select, in accordance with the received slice identifier, the control plane network function from the pool of control plane network functions.

26. The AN of claim 17, wherein the slice identifier comprises a Network Slice Instance Identifier (NSI-ID).

* * * * *